United States Patent [19]
Ross et al.

[11] Patent Number: 5,409,617
[45] Date of Patent: Apr. 25, 1995

[54] ENVIRONMENTALLY ACCEPTABLE WASTE DISPOSAL BY CONVERSION OF HYDROTHERMALLY LABILE COMPOUNDS

[75] Inventors: David S. Ross, Palo Alto; Indira Jayaweera, Fremont; Lien Nguyen, San Jose; Georgina P. Hum, Menlo Park; Werner R. Haag, San Jose, all of Calif.

[73] Assignee: SRI International, Menlo Park, Calif.

[21] Appl. No.: 91,617

[22] Filed: Jul. 13, 1993

[51] Int. Cl.$^6$ ............................. C02F 1/02; C02F 1/72
[52] U.S. Cl. .................................... 210/762; 210/763; 588/221; 588/226; 588/239
[58] Field of Search ....................... 210/761, 762, 763; 588/218, 221, 226, 246, 239

[56] References Cited

U.S. PATENT DOCUMENTS

| | | | |
|---|---|---|---|
| 2,690,425 | 9/1954 | Moses et al. | 210/2 |
| 3,207,572 | 9/1965 | Saul et al. | 23/49 |
| 3,312,231 | 4/1967 | Monroe et al. | 134/111 |
| 3,451,789 | 6/1969 | McIntosh | 23/302 |
| 3,870,631 | 3/1975 | Fassell et al. | 210/63 |
| 3,876,497 | 4/1975 | Hoffman | 162/189 |
| 3,920,506 | 11/1975 | Morgan | 162/31 |
| 4,000,068 | 12/1976 | Nelson et al. | 210/50 |
| 4,005,762 | 8/1976 | Mandoki | 562/483 |
| 4,013,552 | 3/1977 | Kreuter | 210/12 |
| 4,013,560 | 3/1977 | Pradt | 210/152 |
| 4,018,676 | 4/1977 | Hoffsommer et al. | 210/24 |
| 4,038,116 | 7/1977 | Andrews et al. | 149/105 |
| 4,098,627 | 7/1978 | Tompa et al. | 149/109.6 |
| 4,115,264 | 9/1978 | McCarthy et al. | 210/762 |
| 4,141,829 | 2/1979 | Thiel et al. | 210/63 R |
| 4,231,822 | 11/1980 | Roth | 149/109.6 |
| 4,338,199 | 7/1982 | Modell | 210/721 |
| 4,604,215 | 8/1986 | McCorquodale | 210/762 |
| 4,751,005 | 1/1988 | Mitsui et al. | 210/759 |
| 4,758,387 | 7/1988 | Sayles | 264/3.1 |
| 5,011,614 | 4/1991 | Gresser et al. | 210/761 |
| 5,057,220 | 10/1991 | Harada et al. | 210/762 |

FOREIGN PATENT DOCUMENTS

| | | | |
|---|---|---|---|
| 0129755 | 10/1979 | Japan | 210/762 |
| 706586 | 6/1954 | United Kingdom | 51/1 |

OTHER PUBLICATIONS

A. H. Lamberton, et al., *Journal of the Chemical Society*, "Studies of Nitroamines. Part VII. The Decomposition of Methylenedinitroamine in Aqueous Solutions", pp. 1650–1656 (1949).

J. C. Hoffsommer, et al., *Journal of Physical Chemistry*, "Kinetic Isotope Effects of Intermediate Formation for the Aqueous Alkaline Homogeneous Hydrolysis of 1,3,5-Triaza-1,3,5-trinitrocyclohexane (RDX)", vol. 81 (#5), pp. 380–385 (1977).

"Wet Air Oxidation—Solving Today's Hazardous Wastewater Problems", Zimpro Process—Zimpro Inc., Environmental Control Systems, Rothschild, Wisconsin 54474.

*Primary Examiner*—Neil McCarthy
*Attorney, Agent, or Firm*—Howard M. Peters

[57] ABSTRACT

The present invention relates to a process for the disposal of waste or the conversion of hydrothermally labile chemical groups and compounds to species which are environmentally acceptable, or are amendable to further degradation by conventional disposal systems to produce environmentally acceptable products, which process comprises:

(a) conveying an aqueous solution or slurry of ordnance waste material into a reaction zone capable of withstanding the temperatures and pressures of hydrothermal decomposition;

(b) reacting the waste material in the reaction zone with an aqueous composition comprising one or more alkali or alkaline earth metal silicates, borates, phosphates, biphosphates, or trisubstituted-phosphates, at between 200° C. and 500° C. and at a pressure between 10 and 400 atmospheres for between about 0.01 and 10 minutes;

(c) producing compounds which are environmentally acceptable or are amenable to further degradation by conventional disposal systems; and (d) optionally degrading further the compounds of step (e) by reaction in a conventional disposal system. The waste includes ordnance waste, process waste, agricultural waste and the like.

28 Claims, 9 Drawing Sheets

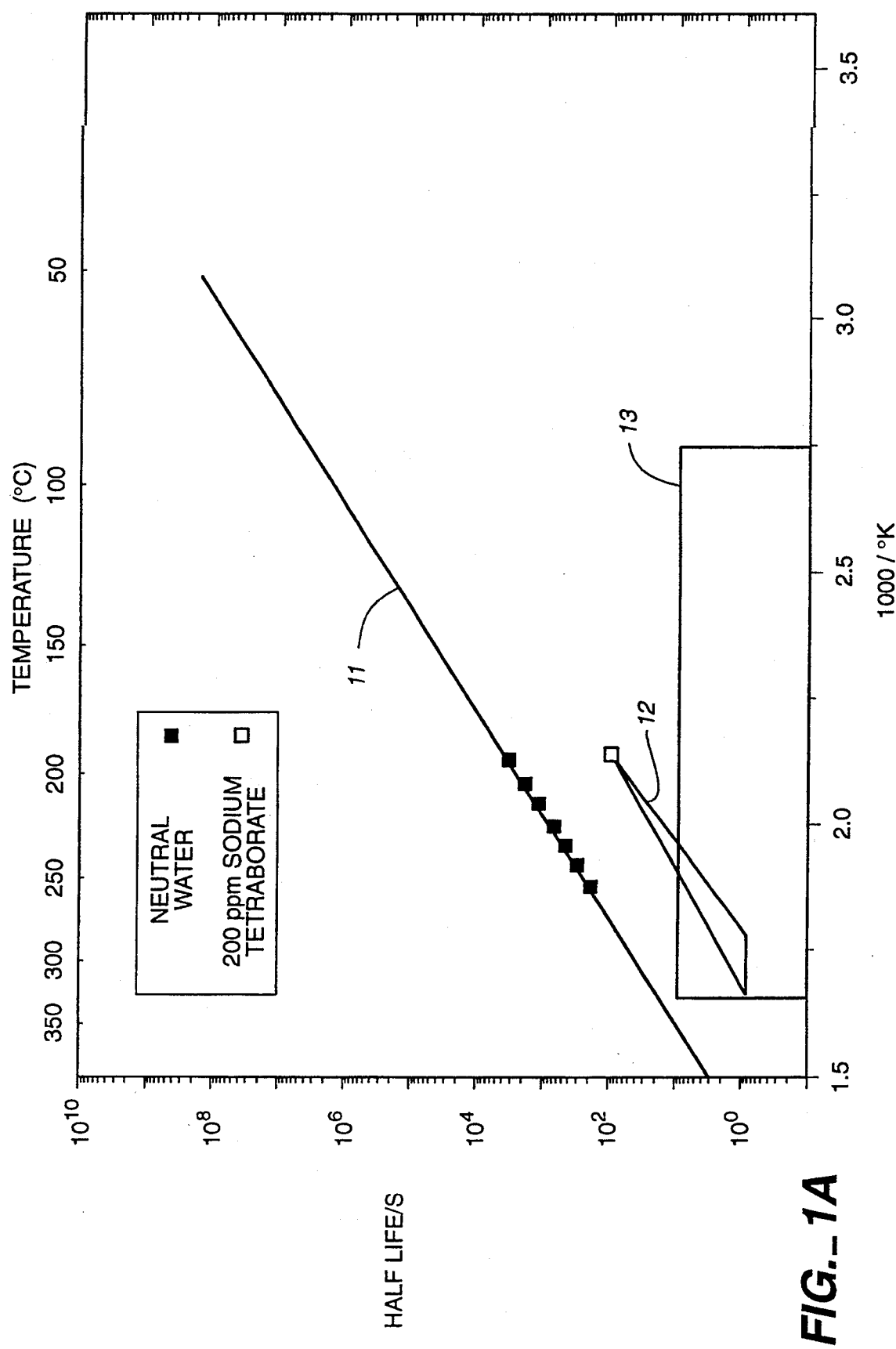
FIG._1A

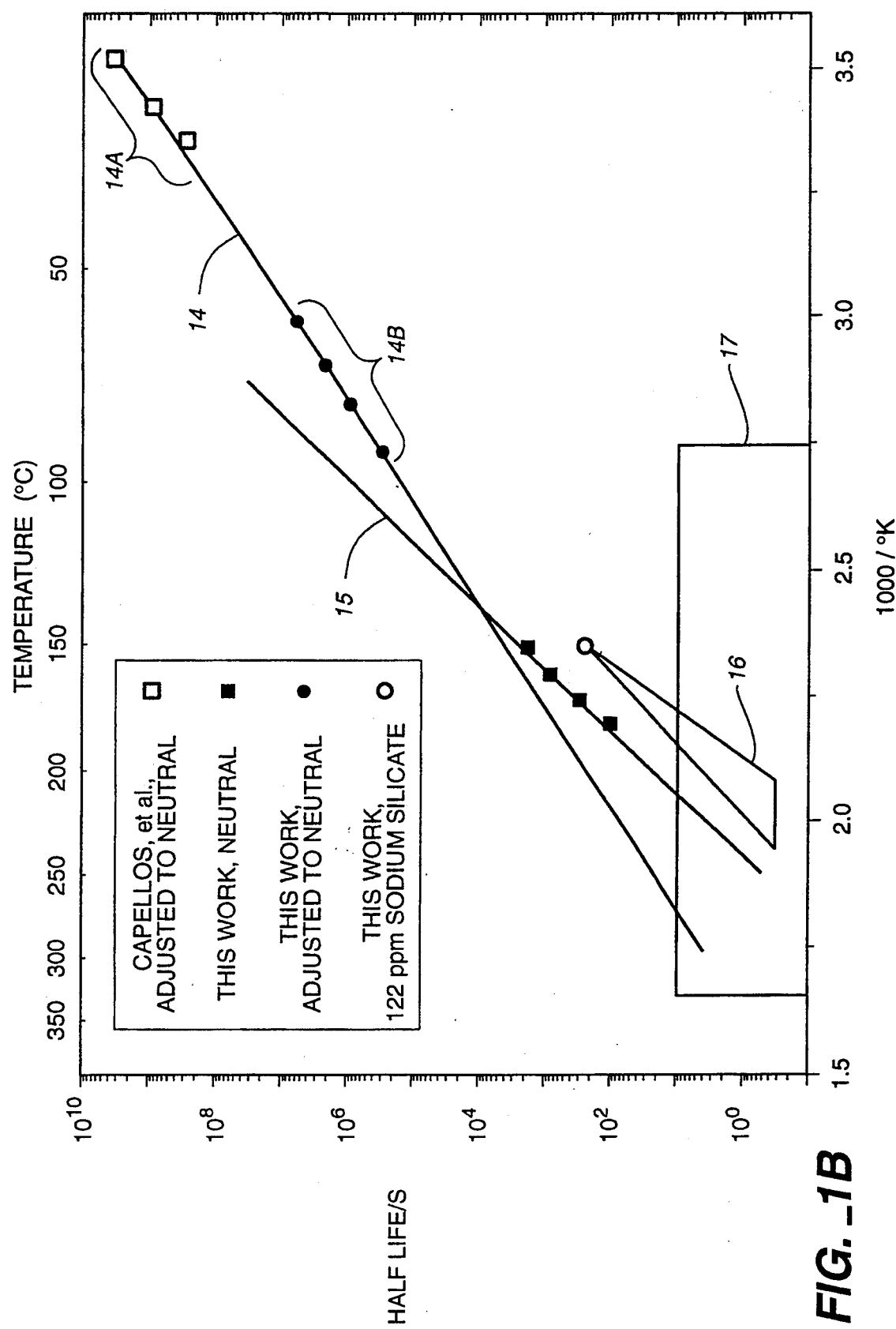
FIG._1B

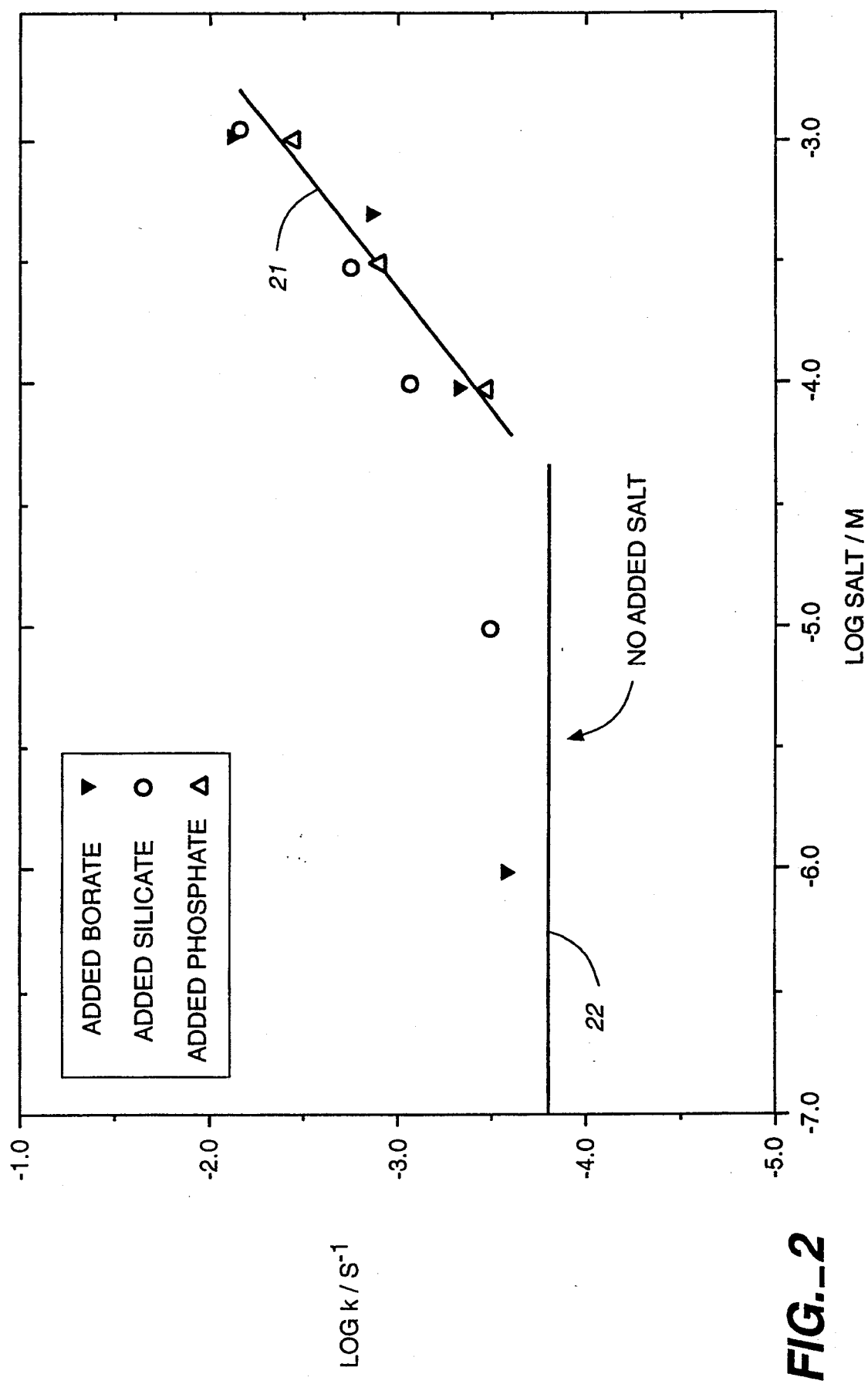
FIG._2

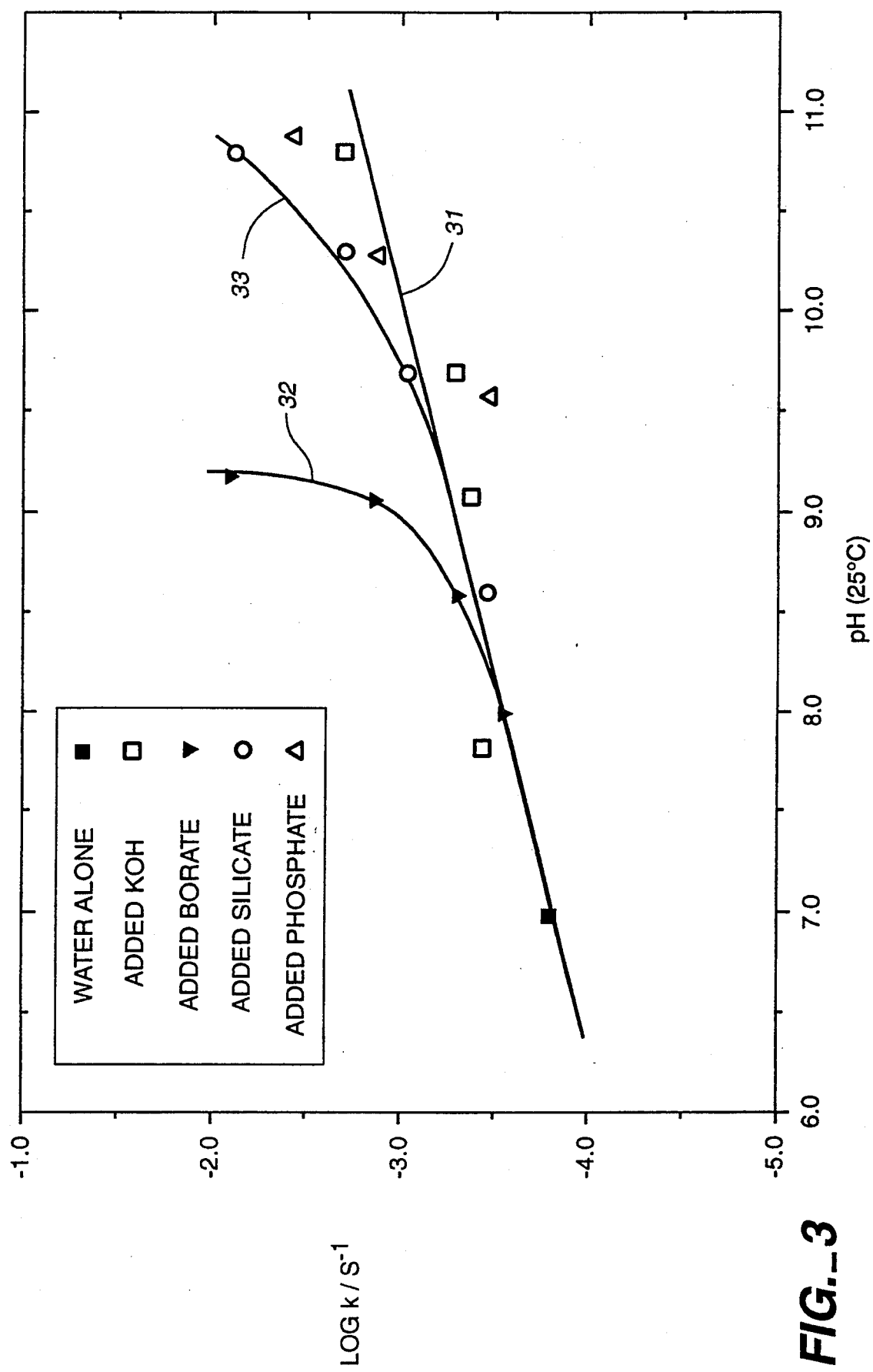
FIG._3

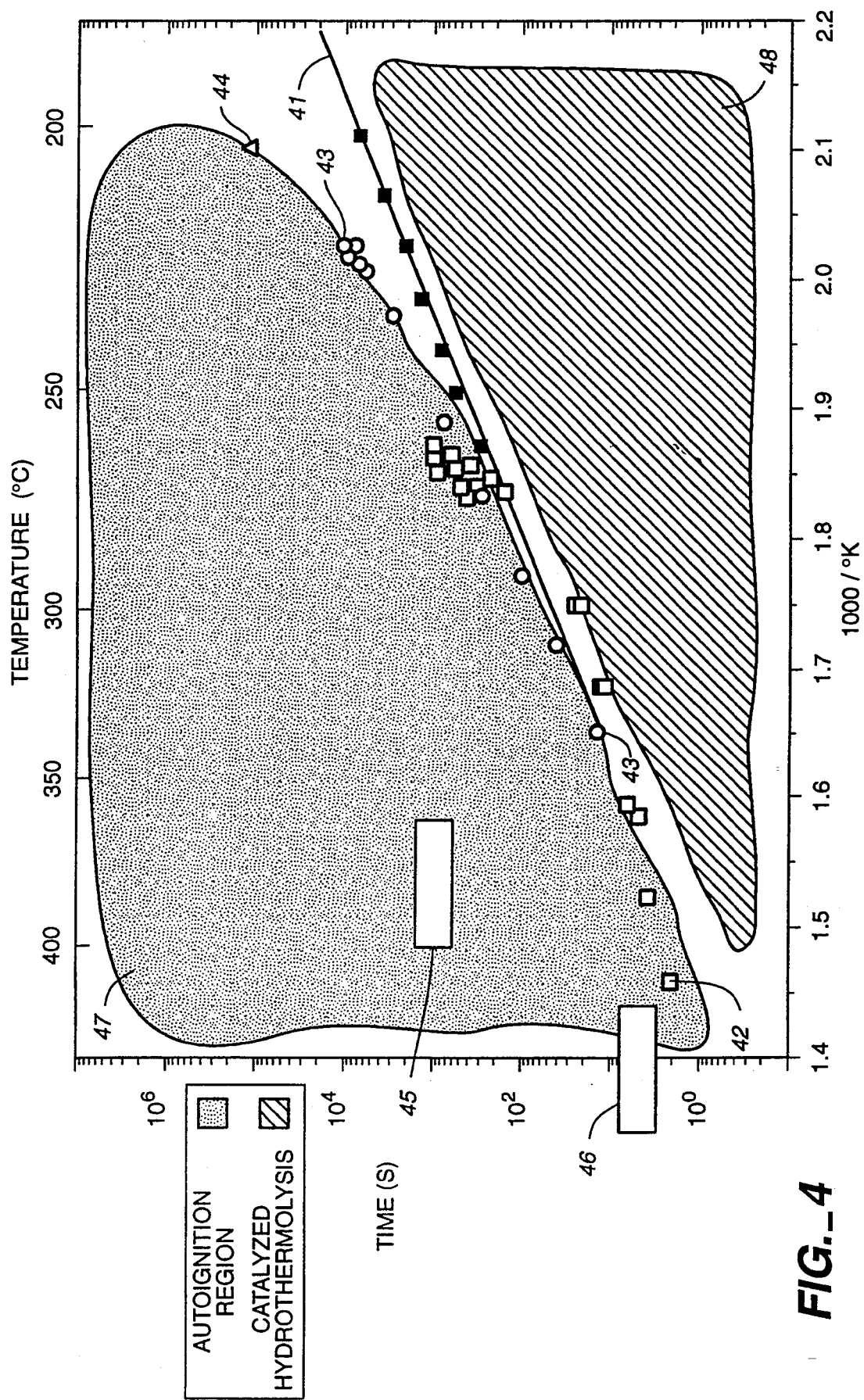
FIG._4

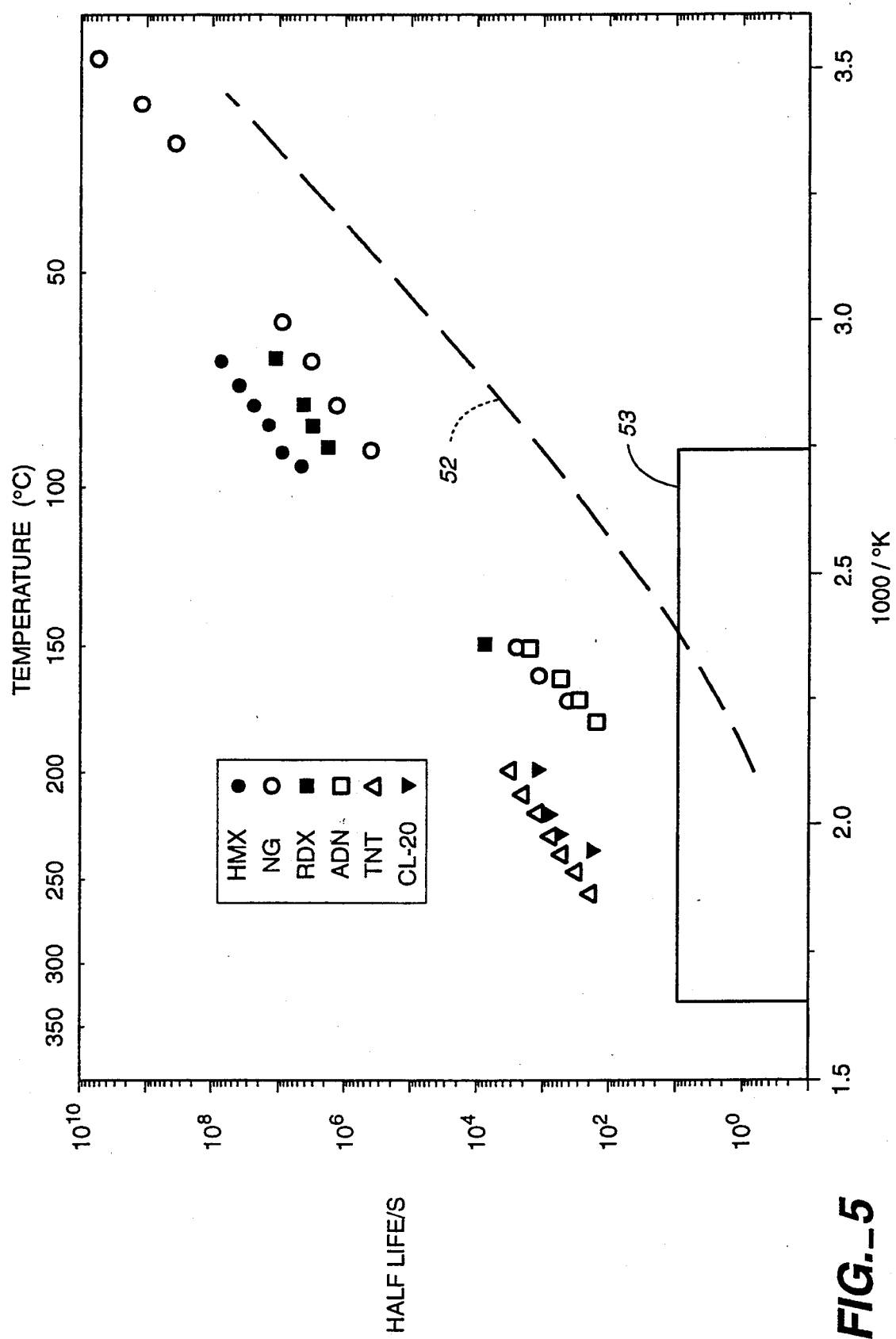
FIG._5

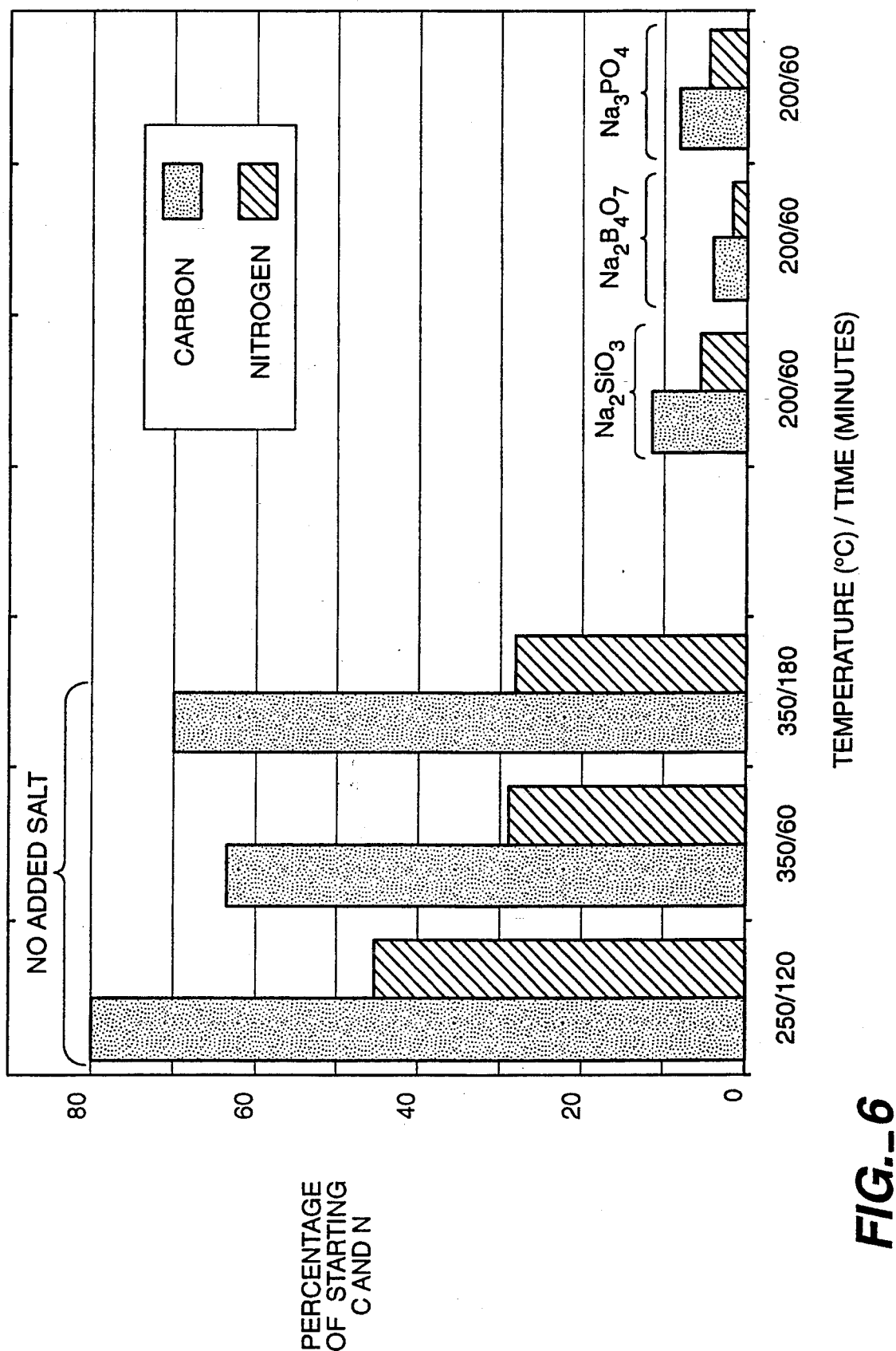
FIG._6

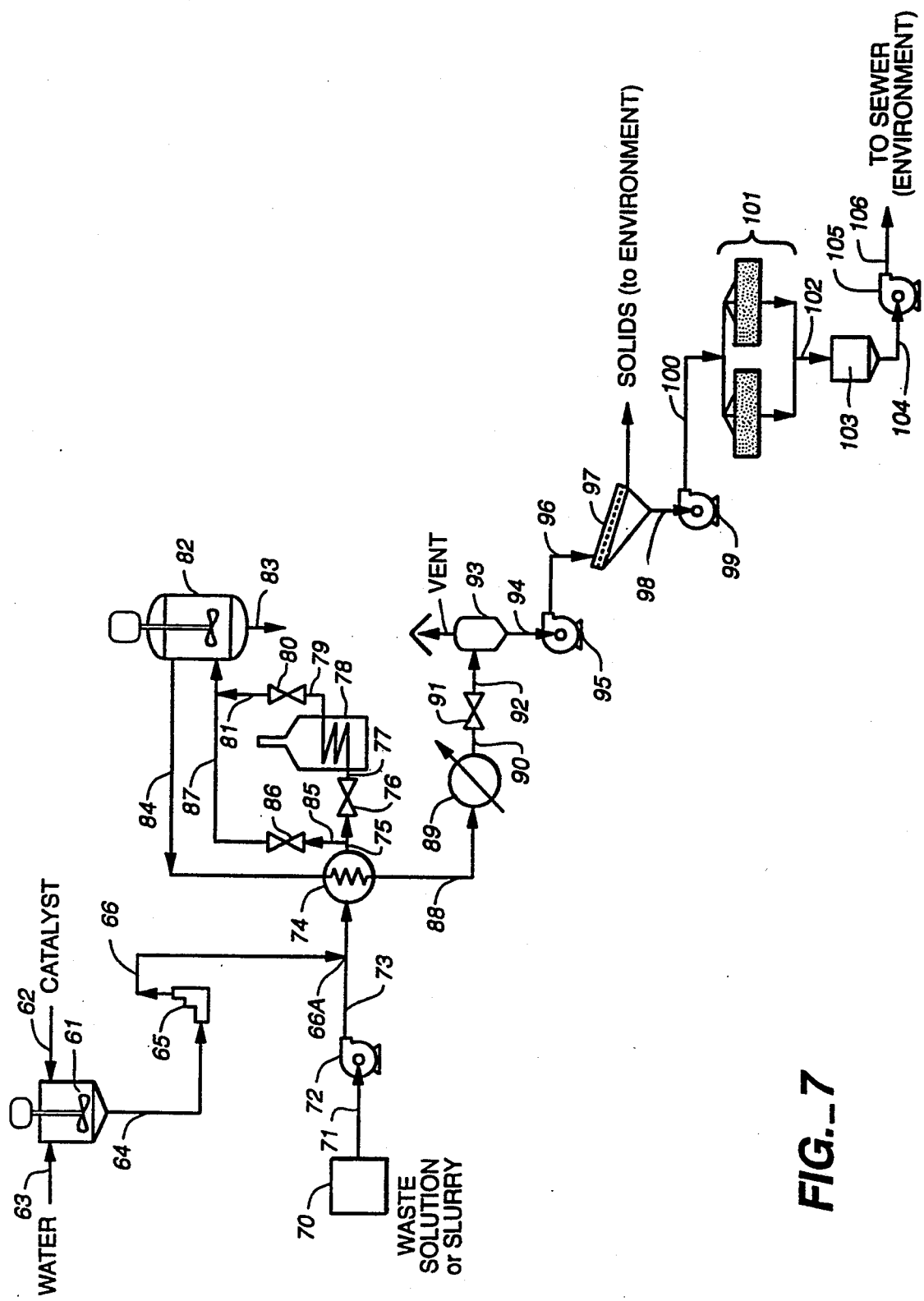
FIG._7

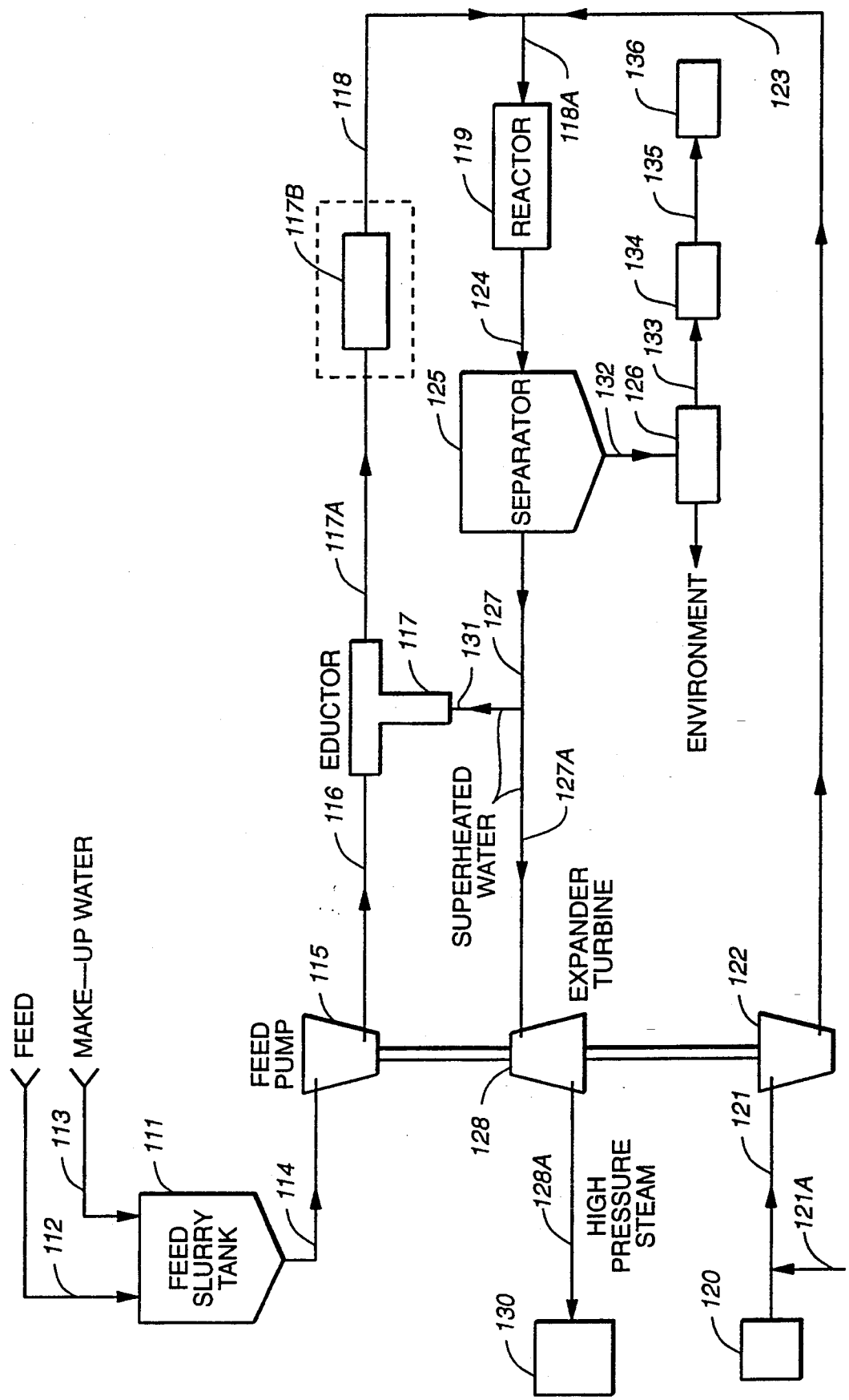
FIG._8

ENVIRONMENTALLY ACCEPTABLE WASTE DISPOSAL BY CONVERSION OF HYDROTHERMALLY LABILE COMPOUNDS

BACKGROUND OF THE INVENTION

1. Field of the Invention

The present invention concerns an improved process for the disposal of waste and the conversion of hydrothermally labile chemical compounds to species which are environmentally acceptable or are more amenable to further degradation by conventional disposal systems to produce environmentally acceptable products. Specifically, the waste materials are reacted with specific aqueous inorganic salts at elevated temperature and pressure, and when necessary the reaction product is optionally further degraded in a conventional biological sewage system.

2. Description of Related Art

Present waste treatment and disposal techniques involve land fill, disposal at sea, combustion in some form, or combinations thereof. General waste treatment and disposal techniques are well known in the art. See for example, N. L. Nemerow in "Industrial Wastes" in *Kirk-Othmer: Encyclopedia of Chemical Technology*, 3rd ed., Vol. 24, pp. 227–256, published in 1984; D. A. Tillman in "Fuels from Waste" in *Kirk-Othmer: Encyclopedia of Chemical Technology*, 3rd ed., Vol. 11, pp. 393–410, published in 1980; and B. R. Crocker et al, in "Incinerators" in *Kirk-Othmer: Encyclopedia of Chemical Technology*, 3rd ed., Vol. 13, pp. 182–206, published in 1981. Waste material includes, but is not limited to, military waste, ordnance waste, dairy products waste, pharmaceutical manufacturing waste, chemical process waste, chemical agents, chemical by-products, agricultural waste, combinations thereof and the like. In particular, the treatment and safe disposal of hazardous military waste has become a project of urgent importance because the scale of disposal has enlarged to proportions far beyond that of only a few years ago.

Current disposal practices most often used are combustion and incineration-based. However, despite significant advances in incineration technology, there is increasing public apprehension and resistance to its present and future use. See, for example, David J. Hanson, in *Chemical and Engineering News*, pp. 7–14, published Mar. 29, 1993.

Some art of interest is as follows:

D. V. Moses, et al. in U.S. Pat. No. 2,690,425 disclose a process for the disposal of industrial wastes of an organic nature by contact with a solid catalyst of manganese-zinc-chromium at a temperature of 100°–350° C. and a pressure of between 200 and 2400 psi.

C. M. Saul in U.S. Pat. No. 3,207,572 disclose a process for the wet combustion of waste liquors containing combustible organic materials. Oxygen or air is always present.

J. W. Monroe, et al. in U.S. Pat. No. 3,312,231 disclose an apparatus and method for the removal and reclamation of solid propellant rocket motor cases. No inorganic salt catalyst is used. Also refer to L. B. Scott in U.S. Pat. No. 3,440,096.

M. J. Mcintosh in U.S. Pat. No. 3,451,789 disclose a process for removing oxidizers from a solid propellant. The process involves the mechanical reduction of the propellant to small crystals followed by contact with leach water.

W. M. Fassell, et al. in U.S. Pat. No. 3,870,631 disclose an apparatus and method for oxidation of organic matter at elevated temperatures and pressures in the presence of oxygen. No salt catalyst is described.

C. A. Hoffman in U.S. Pat. No. 3,876,497 discloses a process for wet air oxidation where the organic materials present in paper mill sludges are converted into environmentally acceptable oxidation products.

J. E. Morgan in U.S. Pat. No. 3,920,506 discloses a process for the wet combustion of waste liquors at elevated temperature and elevated pressure in the presence of an oxygenating gas.

W. T. Nelson et al. in U.S. Pat. No. 4,000,068 disclose a process for the purification of organic compound containing polluted water using a water soluble copper salt catalyst in the presence of oxidizing conditions.

J. W. Mandoki in U.S. Pat. No. 4,005,762 discloses aqueous hydrolyses and depolymerization of condensation polymers at a temperature of between 200° and 300° C. and elevated pressure of at least 15 atmospheres.

J. Kreuter in U.S. Pat. No. 4,013,552 discloses a method of accelerating decomposition of liquid or solid sewage waste by irradiation using ultrasonic energy.

L. A. Pradt in U.S. Pat. No. 4,013,560 discloses a process for wet oxidation of aqueous liquors at elevated temperatures and elevated pressures in the presence of an oxidizing gas to produce mechanical power.

J. C. Hoffsommer, et al. in U.S. Pat. No. 4,018,676 disclose a process for the removal of explosive materials from water by chemical interaction using strongly basic ion exchange resins.

C. C. Andrews, et al. in U.S. Pat. No. 4,038,116 disclose a method for treating an aqueous solution of aromatic explosives. An additive such as acetone or hydrogen peroxide is added to an aqueous solution of organic aromatic explosives, which mixture is exposed to ultraviolet light.

R. Thiel et al. in U.S. Pat. No. 4,141,829 disclose a process for the oxidation of organic substances in an aqueous solution using molecular oxygen at elevated temperature and elevated pressures.

R. P. McCorquodale in U.S. Pat. No. 4,604,215 discloses a process for wet oxidizing an aqueous suspension of organic material at elevated temperature and pressure in the presence of specific inorganic catalysts.

K. Mitsui, et al., in U.S. Pat. No. 4,751,005 disclose the treatment of waste water by subjecting it to wet oxidation in the liquid phase in the presence of a catalyst containing a composite oxide of at least two metals selected from the group consisting of Ti, Si and Zn, and at least one metal selected from the group consisting of Mn, Fe, Co, Ni, W, Cu, Ce, Ag, Pt, Pd, Rh, Ru and In, or a compound of the one metal described above.

D. C. Sayles in U.S. Pat. No. 4,758,387 discloses a process for the decomposition of propellants using water and a detergent at elevated temperatures and pressures.

W. Gresser, et al. in U.S. Pat. No. 5,011,614 disclose a process for effecting thermal decomposition of explosive nitric acid esters in wastewater. In this process, the dissolved esters are exposed to a temperature of between 150° and 300° C. under pressure above the boiling point of the waste water.

The Zimpro process utilizes a wet air oxidation as described in product brochures obtained from Zimpro, Inc., Environmental Control Systems, Rothschild, Wis. 54474.

M. Roth in U.S. Pat. No. 4,231,822 discloses a non-polluting process for desensitizing explosives by contact with a reductant (e.g., oxalic acid, formic acid, glucose, etc.) at elevated temperature.

A. S. Tompa, et al. in U.S. Pat. No. 4,098,627 disclose the solvolytic degradation of pyrotechnic materials containing crosslinked polymers. The process uses a temperature of 50° to 160° C. in a liquid medium having an active hydrogen. No salt compounds as catalysts are disclosed.

M. Modell in U.S. Pat. No. 4,338,199 discloses the supercritical water oxidation (SCWO) of organic materials to obtain useful energy and/or resultant materials using a temperature of at least 377° C. and a pressure of at least 220 atmospheres. In this process, the water present is always in the gas phase above the critical temperature of water. Further, an additional oxidant (e.g. oxygen, etc.) is always present.

The Sterling Drug Co. in British Pat. No. 706,586 disclose a process using between 450° F. and the critical temperature of water, preferably between 480° and 625° F. at elevated pressure for the destructive oxidation of organic materials in aqueous media. No catalyst is present.

A. H. Lamberton, et al. in the *Journal of the Chemical Society* pp. 1650–1656 (1949) disclose the decomposition of nitramines in water at temperatures below 70° C. at pH ranges of 3 to 8 in the absence of added inorganic salts. Inorganic acid, inorganic base and formaldehyde were found to catalyze the decomposition.

J. C. Hoffsommer, et al. in the *Journal of Physical Chemistry*, Vol. 81 (#5), pp. 380–385 (1977) disclose the kinetic and activation parameters for aqueous alkaline homogeneous hydrolysis of 1,3,5-triaza-1,3,5-trinitrocyclohexane (RDX).

None of these references individually or separately teach or suggest the present invention.

All patents, patent applications, articles, references, publications, standards and the like cited in this application are incorporated herein by reference in their entirety.

There is therefore a strong need for alternative methods of decomposition and disposal of waste to the presently used incineration methods. What is needed is a process which circumvents combustion, the need to introduce air, oxygen or other oxidants, and the need to introduce promoters which are often themselves environmentally unsuitable. Further, the process should at the same time have the flexibility to handle a wide range of waste materials with high degrees of volume, reliability and safety. Further, control of the species in the overall product stream should be possible, in that the products can either be discharged directly to the environment or can be readily treated effectively and efficiently by conventional secondary waste treatment processes and facilities.

The operational and commercial value of the present invention is that it provides a process to decompose waste material safely to environmentally acceptable products at milder conditions than are currently available. Further, it provides a framework for one to be able to control the rate of hydrothermal decomposition by judicious choice of salt(s), waste material, concentrations, temperature and pressure. That is to say, the hydrothermal decomposition is accelerated using the catalysts to practical and economically useful rates, while at the same time the rate is safely controlled within conventional equipment so that it is not so fast as to be uncontrolled or hazardous. The present invention provides a process to accomplish these results.

SUMMARY OF THE INVENTION

The present invention provides a process for the hydrothermal decomposition of waste materials under controlled, safe and practical conditions. Specifically aqueous solutions or suspensions of silica or inorganic alkali metal or alkaline earth metal silicate, borate, phosphate, biphosphate, trisubstituted-phosphate or combinations thereof are used as catalysts. These inorganic catalysts make it possible for rapid hydrothermal decomposition (to 99.9+ %) of the waste at temperatures of between about 200° to 500° C. and pressures of between about 20 and 500 atmospheres within about 0.01 and 10 min wherein some water is present as a liquid.

More specifically, the present invention relates to a process for the disposal of waste or the conversion of hydrothermally labile chemical groups and compounds to chemical species which are environmentally acceptable, or are amendable to further degradation by conventional disposal systems to produce environmentally acceptable products, which hydrothermal decomposition process comprises:

(a) conveying an aqueous solution or slurry of the waste material into a reaction zone capable of safely withstanding the temperatures and pressures of the hydrothermal decomposition;

(b) reacting the waste material in the reaction zone with an aqueous composition comprising silica or one or more alkali metal or alkaline earth metal silicates, borates, phosphates, biphosphates, or trisubstitutedphosphates, at between about 200° C. and 500° C. and at a pressure between about 20 and 500 atmospheres for between about 0.01 and 10 minutes;

(c) producing compounds which are environmentally acceptable or are amenable to further degradation by conventional disposal systems; and (d) optionally degrading further the compounds of step (c) by reaction in a conventional disposal system. Some water is always present as a liquid.

In one preferred embodiment the reaction zone in step (a) is capable of withstanding a temperature up to about 400° C. and pressures of up to about 400 atmospheres, and in step (b) the reaction temperature is between about 250° and 400° C. and the pressure is between about 100 and 300 atmospheres. Some water as a liquid is always present.

In another preferred embodiment the reaction temperature is between about 250° C. up to, but not at or above the critical temperature, and the pressure is between about 100 and 300 atmospheres. Some water as a liquid is always present in this preferred embodiment.

In another preferred method the hydrothermal decomposition occurs in the essential absence of any added oxidizing material or oxidizing catalyst.

In another preferred embodiment, the time of hydrothermolytic decomposition is between about 0.1 and 5 minutes.

In another preferred embodiment, the reaction equipment of step (a) is capable of withstanding a temperature of between about 200° to 400° C. and a pressure of between about 100 and 250 atmospheres.

In one preferred embodiment of the process, the waste material is independently selected from ordnance waste, dairy waste, pharmaceutical waste, chemical agents, chemical by-products waste, chemical and chemical processing waste, agricultural waste or combinations thereof.

More specifically, the preferred ordnance waste is selected from nitrate esters, nitramines and nitroarenes, and especially preferred is ordnance waste wherein the nitrate esters are selected from nitroglycerin, nitrate-containing binders or pentaerythritol tetranitrate, the nitramines are selected from cyclotrimethylenetrinitramine (RDX) or cyclotetramethylenetetranitramine (HMX) and the nitroarenes are selected from 2,4- or 2,6-dinitrotoluene, 2,4,6-trinitrotoluene (TNT) or picric acid.

One preferred embodiment of the process is to heat the reaction mixture just below the critical temperature, and the salt of the catalyst composition is independently selected from:

lithium silicate, sodium silicate, potassium silicate, rubidium silicate, cesium silicate, lithium borate, sodium borate, potassium borate, rubidium borate, cesium borate, lithium phosphate, sodium phosphate, potassium phosphate, rubidium phosphate, cesium phosphate, lithium biphosphate, potassium biphosphate, rubidium biphosphate, cesium biphosphate, trilithium phosphate, trisodium phosphate, tripotassium phosphate, trirubidium triphosphate, tricesium phosphate, magnesium silicate, calcium silicate, barium silicate, strontium silicate, magnesium borate, calcium borate, barium borate, strontium borate, magnesium phosphate, calcium phosphate, barium phosphate, strontium phosphate, magnesium biphosphate, calcium biphosphate, barium biphosphate, strontium biphosphate, trimagnesium phosphate, tricalcium phosphate, tribarium phosphate, tristrontium phosphate or combinations thereof. More preferably, the salt is independently selected from sodium borate, potassium borate, sodium silicate, potassium silicate, trisodium phosphate, tripotassium phosphate or combinations thereof.

A preferred embodiment is a process wherein:
the waste material is selected from ordnance, ordnance waste or ordnance formation waste water; and
in step (b) the reaction temperature is between about 200° and 373° C. and below the critical temperature of water, and the reaction time is between 0.01 and 5 minutes and, the salts are present in the aqueous composition in a concentration of between about 1 and 40 percent by weight of the salt/water present. More preferably the inorganic salts are independently selected from sodium borate, potassium borate, sodium silicate, potassium silicate or combinations thereof.

BRIEF DESCRIPTION OF THE FIGURES

FIG. 1A is a graphic representation of the Arrhenius plot for the hydrothermal decomposition of TNT in liquid water and added sodium tetraborate at 200° C.

FIG. 1B is a graphic representation of the Arrhenius plot for the hydrothermal decomposition for nitroglycerin (NG) in liquid water and added sodium tetraborate at 200° C.

FIG. 2 is a graphic representation of the first order rate constants for the decomposition of trinitrotoluene (TNT) in water containing mM quantities of dissolved sodium salts: silicate, borate and phosphate.

FIG. 3 is a graphic representation of the effects of pH on the hydrothermolytic decomposition of TNT for solutions at different temperatures and times.

FIG. 4 is a graphic representation for the hydrothermolytic decomposition of TNT and other materials at 200° C. in liquid water versus the pH of the starting solution.

FIG. 5 is a graphic representation of the time to explosion and kinetics of hydrothermolysis for TNT constructed using the present data and some literature sources. The conditions for wet air oxidation and supercritical water oxidation are noted.

FIG. 6 is a graphic representation of the fraction of the starting carbon and nitrogen quantities present in the recovered solids from the hydrothermolysis of TNT.

FIG. 7 is a schematic representation of one embodiment of the process of hydrothermal decomposition of waste material.

FIG. 8 is a schematic representation of another embodiment of the process of hydrothermal decomposition of waste material. The process heat is also used to turn a turbine.

DETAILED DESCRIPTION OF THE INVENTION AND PREFERRED EMBODIMENTS

Definitions

As used herein:

"ADN" refers to ammonium dinitramide.

"Catalyst composition" refers to silica or to salt compounds independently selected from lithium silicate, sodium silicate, potassium silicate, rubidium silicate, cesium silicate, lithium borate, sodium borate, potassium borate, rubidium borate, cesium borate, lithium phosphate, sodium phosphate, potassium phosphate, rubidium phosphate, cesium phosphate, lithium biphosphate, potassium biphosphate, rubidium biphosphate, cesium biphosphate, trilithium phosphate, trisodium phosphate, tripotassium phosphate, trirubidium triphosphate, tricesium phosphate, magnesium silicate, calcium silicate, barium silicate, strontium silicate, magnesium borate, calcium borate, barium borate, strontium borate, magnesium phosphate, calcium phosphate, barium phosphate, strontium phosphate, magnesium biphosphate, calcium biphosphate, barium biphosphate, strontium biphosphate, trimagnesium phosphate, tricalcium phosphate, tribarium phosphate, tristrontium phosphate or combinations thereof. Preferably the salt is independently selected from sodium borate, potassium borate, sodium silicate, potassium silicate, sodium phosphate, potassium phosphate or combinations thereof. Inorganic borates or silicates are more preferred, and the sodium or potassium salts are especially preferred.

"CL-20" refers to a caged organic nitramine, the exact structure of which is still classified by the U.S. Department of Defense. Its hydrothermal decomposition is similar to that of HMX.

"HMX" refers to 1,3,5,7-tetranitro-1,3,5,7-tetraazacyclooctane or to cyclotetramethylenetetranitramine.

"DNT" refers to 2,4- or 2,6-dinitrotoluene or combinations thereof.

"NG" refers to nitroglycerin.

"Nitroalkanes" refers to the C1 to C12 mono or poly nitro substituted alkanes. These compounds may be present in a waste stream, as a product, as by-products, as unreacted materials, or as trace contaminants. Nitromethane is a preferred nitroalkane.

"Nitrogen-containing inorganic salt" refers preferably to ammonium dinitramide (ADN), $NH_4^+N(NO_2)_2^-$.

"Ordnance waste" refers to energetic materials, binder propellants, nitroalkanes and the like as used in missiles, rockets, bombs, shells and the like. Some representative materials are shown below:

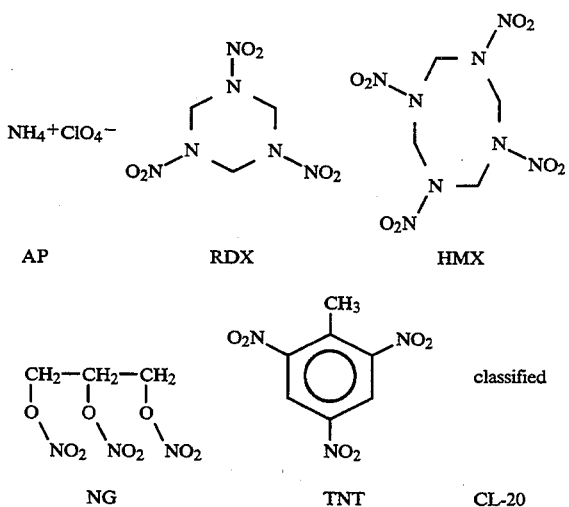

AP  RDX  HMX

NG  TNT  CL-20

"RDX" refers to 1,3,5-trinitro-1,3,5-triazacyclohexane or to cyclotrimethylenetrintramine.

"Sodium silicate" refers to structures varying from $Na_2O\cdot3.75SiO_2$ to $2Na_2O\cdot SiO_2$ and also various portions of water. Usually the structure is $Na_2SiO_3$ having a formula weight of 122.08.

"Sodium tetraborate" refers to the compound of formula $Na_2B_4O_7\cdot10HOH$ having a formula weight of 381.37. It is also known as sodium borate, sodium pyroborate or borax.

"Trisodium phosphate" refers to a structure represented as $Na_3PO_4\cdot12HOH$ having a formula weight of 380.12. It is also known as tribasic sodium phosphate, TSP, and trisodium orthophosphate.

"TNT" refers to 2, 4, 6-trinitrotoluene.

As is described above the available methods of decomposition of waste organic and inorganic materials have significant problems. The improved process of the present invention encompasses a broad range of catalysts, temperatures, pressures, concentrations and the like.

Some more specific combinations are listed below and are subsequently discussed in more detail.

The following catalyst conditions are at temperatures up to but not including the critical temperature of water. Thus, some water as a liquid is always present:
 1. Dilute solutions of catalyst,
 2. Intermediate concentrations of catalyst, and
 3. High concentrations of catalyst.

All Conditions Are Below The Critical Temperature Of Water (200° to 373° C.; 20 to 300 atm)

The combination of thermal, pressure, and time requirements of the present catalyzed process are surprisingly lower than those reported for conventional art processes. Decomposition of the waste material under the reaction conditions of the present invention, e.g., ordnance waste, generally proceeds very quickly. The residence times are very brief so that even with a residence time of up to about 10 min, or about 1–2 min or less, complete degradation of the waste occurs. Further, residence times of the waste in this lowered temperature range translate into modestly sized plants which can have very high rates of contaminated feed using conventional process equipment and subsequent degradation, when necessary, using conventional biodegradation processes. In contrast, wet air oxidation (e.g., the Zimpro process) typically requires residence in tens of min, and supercritical water oxidation (SCWO) requires higher temperatures and pressures and often an oxidizing catalyst.

1. Dilute Concentrations of Catalyst

Referring now to the Figures, FIG. 1A is a conventional Arrhenius plot for the decomposition of TNT in neutral water from about 200° to 260° C. The straight line 11 is extrapolated to higher temperatures. Surprisingly, when catalytic amounts of sodium tetraborate are added, it is seen that the reaction rate increases significantly, region 12. Region 13 defines the favorable region of temperature and half lives of reaction for TNT. As can be seen in FIG. 1A, the sodium tetraborate as a catalyst moves the hydrothermal decomposition of TNT into the favorable region (overlap of region 12 and 13) for more moderate reaction conditions, resulting in 99.99+ % decomposition.

FIG. 1B is a graphic representation of the Arrhenius plot for the hydrothermal decomposition of nitroglycerin (NG) in liquid water and added tetraborate at 200° C. The data for the base catalyzed hydrolysis is of Capellos et al., Int. J. Chem. Kinet, Vol. 16, pp. 1027–1051 (1984) are shown as part 14A of line 14, wherein the points are adjusted to neutral. The results of this research adjusted to neutral are shown as part 14B of line 14. Line 15 represents the results of this research performed at neutral, and reflects the onset of an even faster reaction for hydrothermal decomposition. Surprisingly, when catalytic amounts of sodium silicate are added, it is seen that the reaction rate for NG increases significantly, region, 16. The overlapping region of region 16 and region 17 defines the favorable region of moderate temperature and half lives for controlled hydrothermal decomposition of NG of the present invention, to 99.9+ percent decomposition or greater, preferably to 99.99+ percent decomposition, more preferably to 99.999+ percent decomposition.

In FIG. 2, catalysis of the hydrothermolysis of energetic materials by added salts is demonstrated by studies with TNT. The data for TNT, which has displayed the greatest resistance to hydrothermal degradation, are presented. Decomposition kinetics were studied in liquid water at 200° C. with the addition of millimolar quantities of $Na_2B_4O_7$, $Na_2SiO_3$, and $Na_3PO_4$. The results in FIG. 2 demonstrate that the kinetic effects are similar for the three salts, with an apparent first-order dependence on salt concentration (line 21), and apply similarly to nitrate esters, nitramines, and to other functionalized organic molecules. Line 22 represents the kinetics of the hydrothermal decomposition with no added salt.

Since some of the salts can generate basic solutions with high pH values (in the case of trisodium phosphate up to almost pH 11), additional studies were conducted with added KOH so that effects of basicity and salt addition could be separated.

As shown in FIG. 3, when pH is considered; however, there is a considerable difference in the net effects. Water alone and added KOH are shown as composite straight line 31. The potassium hydroxide data show a modest promotion of the decomposition by base (slope=0.24, $R^2$=0.86). However, it is clear that sodium tetraborate (line 32), and to a lesser extent silicate (line 33), promote and catalyze the hydrothermal decomposition substantially beyond that seen for the base-promoted reaction. This is a surprising and completely unexpected result based on known salt effects. Thus at pH 9, 1.0 mM tetraborate ($1.3\times10^{-2}$ weight percent) increases the rate of reaction by 1 order of magnitude.

FIG. 4 shows that the data points fall for six different energetic compounds in a surprisingly narrow band. Some results for spontaneous (uncatalyzed) decomposition of TNT, NG, HMX and RDX in neutral water (pH=7) are shown in FIG. 4, also this figure is an Arrhenius plot showing half lives (i.e., periods of decomposition of half of the remaining waste material) as a function of temperature. The decomposition rates are rapid at temperatures up to about 300° C. (at autogenous pressure of 83 atm).

Useful conclusions are drawn from these figures:

The rapid rates of hydrothermal decomposition are due to salt effects.

Rapid rates for TNT using borate moves the half life of the reaction into the $\leq$10 sec region.

More importantly, as shown in FIG. 4, with the addition of catalytic quantities of the inorganic compounds or salts of the present invention, the region of the hydrothermal decomposition rates suggested by line 52 drop well into the useful region 53. Region 53 defines and describes the operationally preferred hydrothermal decomposition region of seconds or tens of seconds at reasonable temperatures (and pressures). Ten to 15 half lives are equivalent to high levels of thermohydrolytic decomposition (e.g., 99.9+, to 99.99+, to 99.999+ % decomposition). Thus, a process with a half life of about 10 sec and residence times of less than 170 sec would provide an improved level of decomposition of 99.999+ %.

While not wanting to be bound by theory, it appears that the density of water stays liquid-like (density=0.35 g/ml) up to the supercritical temperature (about 374° C.). However, within this temperature region the viscosity of the liquid water falls rapidly to very low values as the temperature is increased. The dielectric constant also declines smoothly in the near critical temperature range to values comparable to polar organic liquids. The surprising result as demonstrated by the present invention is a fluid medium having a solvent capacity as a liquid, a capacity for dissolving both ionic salts and organic compounds, and viscosity and diffusivity comparable to a gas.

FIG. 5 shows the time to explosion and kinetics of hydrothermolysis data for TNT, and is created using some of the present data and some published data.

Hydrothermolysis of the present invention is shown by line 41 treated by the solid boxes—■.

The time to explosion data creating line 47 are from R. Rogers, "Incompatibility in Explosive Mixtures." *I&EC Product Research and Development*, Vol. 1, pp. 169-172 (1962) and shown as open boxes □ —42;

The thermal decomposition of TNT is found in R. McQuire, et al., "Chemical Decomposition Models for the Thermal Explosion of Confined HMX, TATB, RDX and TNT Explosives", which is shown as open circle —○. *Proceedings Seventh Symposium (International) on Detonation*. Naval Surface Weapons Center, MP 82-334, 56-64 (1981). Also see J. Dacons et al., *J. Physical Chemistry*, Vol. 74, 3035-3040 (1970) which are shown as open triangles △—44.

The wet air oxidation data are from W. M. Copa et al., "Wet Air Oxidation of Propellants and Propellant Wastewater." Paper presented at the JANNAF Workshop, Tyndall AFB, March 27-28 (1990), and the data are shown as a box region 45.

The supercritical water oxidation (SCWO) data are from an open seminar at SRI International by J. Robinson, "Hydrothermal Processing of Hazardous Waste." Presentation by Los Alamos National Laboratory (LANL) studies in supercritical water oxidation and related activities, Dec. 19, 1992, and is shown as a box region 46.

Irregular region 47 of FIG. 5 defines the temperature, pressure and time conditions wherein autoignition will occur when these parameters are present.

Note that both the wet oxidation process, region 45, and supercritical water oxidation process (SCWO), region 46, of the conventional decomposition art are both found in this hazardous autoignition region. Thus, there is always a danger using these processes.

On the other hand, irregular region 48 defines the temperature and time conditions of the present invention wherein only catalyzed hydrothermolytic decomposition will occur.

FIG. 6 is a graphic representation of the fraction of the carbon and nitrogen quantities present in the recovered solids from the hydrothermal decomposition of TNT. The temperature (° C.) and time (min) is shown on the x-axis. As can be seen most of the carbon and nitrogen remain for the experiments wherein there is no added inorganic salt. However, for similar experiments (at lower temperatures and time conditions), in the presence of the salts of the present invention, significantly lower fractions of carbon and nitrogen.

As shown in FIG. 6, a bulk TNT reaction is run having very high levels of salts. TNT is present at levels well above its room temperature solubility limits in water thus there was solid TNT present at the start of an experiment. Since TNT melts at 80° C., it, of course, is molten at that temperature. The salts themselves were partially insoluble. Both salt and control (salt-free) runs were performed, and a dark solid was recovered from all runs. In the control runs, the solid residue was an unidentified organic product, but in the added salt runs the solids were essentially only the added salt. These results are shown in FIG. 6 which shows the fraction of the starting C and N quantities which were present in the recovered solids after the hydrothermolysis of TNT the residue were virtually the solid portion of the starting salts.

Borate ion in this case appears to be the most effective salt, with the recovered carbon and nitrogen on the product solid well below 10% of the starting quantities. Analyses of the recovered aqueous fractions have not accounted for the missing carbon or nitrogen, although formate, glycolate and nitrate were identified. It is expected that most of the missing material is in the gas phase as $N_2$, $N_2O$, $CO$ and $CO_2$.

The simplest manner to perform the present invention in a batch process is to combine the waste, water and catalyst in a pressure vessel, heat the vessel to the desired temperature for the time desired, cool to ambient conditions and discharge the acceptable compounds to the environment or optionally to any conventional system for the destruction of the waste compounds to environmentally acceptable products.

An embodiment of a continuous process of the present invention is shown in FIG. 7. Water enters the stirred dissolving tank 61 via line 63 and catalyst is added via line 62. After mixing, the solution or slurry is conveyed via line 64 through eductor 65 and exits via line 66. The waste material as a solution or a slurry is retained in container 70. The waste solution or slurry is conveyed via line 71 to pump 72 and exits via line 73. The waste stream and catalyst stream combine at T-joint 66A and are conveyed to heat exchanger 74. For the stream exiting in line 75, two options are available. The aqueous mixture passes through valve 76 into line 77 into the preheater 78, exit in a heated state through line 79, pass through valve 80 and line 81 into line 87. Alternatively, the combined aqueous mixture enters line 85 pass through value 86 and exits in line 87. The waste mixture (heated or unheated) in line 87 enters the heated reactor 82 and passes through at predetermined time, temperature and pressure conditions to obtain the level of hydrothermal decomposition desired. A drain valve 83 to remove samples is shown. The hot hydrothermally decomposed waste stream is conveyed through line 84 into heat exchanger 74 and exits in line 88 into cooling chamber 89 to reduce the temperature to about ambient. The waste solution or slurry is next conveyed via line 90 through valve 91 and line 92 into flash drum 93. The liquid (or slurry) is conveyed through line 94, into pump 95, through line 96 and to stationary screen 97 to remove solids. These solids may be discharged to the environment. The aqueous portion is conveyed via line 98 to pump 99 and is transported via line 100 to any one of many conventional treatment systems 101, preferably biological. The system shown in FIG. 7 as system 101 is a conventional aerated biotreatment system. The water portions are then combined and conveyed via line 102 to holding tank 103. Finally, the liquid is conveyed via line 104 to pump 105 and then discharged to the environment via line 106.

A simplified continuous process can be constructed using specific components described in FIG. 8. That is to say, waste feed is directly connected to reactor 119 by line 112, the make up water is connected to reactor 119 via line 113, and catalyst (in liquid or solid form) in vessel 120 is connected to reactor 119 via line 121. Reactor 119 is constructed of materials to withstand the reaction conditions. The product of the thermolysis exits the reactor via line 124 to the acceptable reaction products 126 which are discharged to the environment. Alternatively, when the degraded waste products 126 are not yet environmentally acceptable, they can be conveyed via line 133 to a conventional degradation system, such as a biological sewage treatment plant 134, and the acceptable products are then conveyed to the environment.

One of ordinary skill in the art having this specification can construct an equipment system to perform the hydrothermal decomposition.

Another example illustrates the present invention is similar to that described by M. Modell in U.S. Pat. No. 4,338,199, using the system shown in FIG. 8. There are, however, significant differences. Modell uses oxidizing catalysts for the oxidation reactions, and all disclosure is for supercritical water (SCW), i.e. gaseous conditions.

The feed material of this invention includes, but is not limited to the waste material described herein above and enters the reaction system via line 112 to feed tank 111. Make up water (and optionally inorganic catalyst) as needed is added via line 113. This reaction mixture in the feed tank is mixed such that the waste is present at a concentration of between about 0.01 to 20 percent by weight of the waste -water- catalyst present. The catalyst present in one embodiment is between about 5 and 15 percent by weight of the waste material present.

The reaction mixture is conveyed through line 114 to the feed pump 115 and then through line 116. The eductor 117 assists in the preheating of the feed as a portion of the superheated water is recycled using lines 124, 127 and 131 from the hot reactor 119 (aka reaction vessel 119). This configuration may provide for sufficient heating of the aqueous feed to bring the reactor 119 effluent to near supercritical conditions.

The heating is also accomplished by conveying the reaction mixture through line 117A (through optional reformer 117B for hydrocarbon waste), line 118 and line 118A.

The catalyst may be added in line 113, or alternatively, the catalyst, as an aqueous solution or as an aqueous slurry, is stored in vessel 120, conveyed via line 121 to a pump or compressor 122. Water as needed is added by line 121A. The catalyst is pumped under pressure through line 123 to mix at line 118A prior to entering reactor 119. Reactor 119 is fabricated of known alloys sufficient to safely contain pressures up to 500° atmospheres and temperatures of 500° C.

The mixture of reactants (waste, water, and inorganic catalyst) is fed to reactor 119, which can be of any suitable form, such as a tubular reactor or a fluidized bed. Generally low length-to-diameter (L-D) ratios in the fluidized bed are desired wherein the inorganic catalyst content is high so as to minimize the reactor surface area and minimize and deposition of reactants or products on the interior walls of reactor 119. Reactor 119 is heated or operates such that the controlled heat released by hydrothermal decomposition of the waste may be sufficient to raise the fluid phase to temperatures in the operative temperature ranges of the process.

The remainder of the superheated water is optionally available for power generation, heating or other uses for high pressure steam (i.e. via line 127A to the expander turbine 128 through line 128A as high pressure steam and environmentally acceptable gaseous reaction products to the environment 130.

The effluent from the reactor 119 is transported using line 124 to separator 125 where optionally insoluble materials are removed via line 132 as reaction products. These reaction products 126 are already environmentally acceptable and are discharged or are now reaction products which now amendable to further degradation by transfer using line 133 to a disposal system 134 (i.e. conventional biological sewage system) for ultimate acceptable discharge via line 135 to the environment 136.

The first reaction kinetics of the present invention will usually occur and be independent of concentration of waste. Preferred ratios of waste, catalyst and water are provided below.

2. Intermediate Concentrations of Catalyst

In this embodiment, the concentrations of the catalyst present are between about 1.51 and 9.99 percent by weight of the catalyst-water combination. Under these intermediate concentration levels of catalyst, the hydrothermolytic decomposition of waste is accelerated as expected based on the amount of catalyst and waste present. Water as a liquid is always present. The preferred temperatures are from about 200° to 373° C.

The waste is present in between about 1 and 20 percent by weight of the waste-catalyst-water combination.

With minor modifications, the processes described above for FIGS. 7 or 8, are applicable for these levels of catalyst concentrations.

3. High Concentrations of Catalyst

In this embodiment the concentration of catalyst present is between about 10.0 and 40 percent by weight of the catalyst-water combination. Under these levels of catalyst, the hydrothermolytic decomposition of waste is accelerated as would be expected based on the amount of catalyst and waste percent. Water as a liquid is always present, the useful temperatures are from about 200° to 400° C.

The waste is present in between about 1 and 20 percent by weight of the waste-catalyst-water combination.

With minor modifications, the process described above for FIGS. 7 or 8, is applicable for these levels of catalyst and concentrations.

It is to be understood that the concentrations of the solutes (catalysts) in the present invention for the concentration levels identified immediately above as paragraphs 1, 2, 3 may elevate the critical temperature values for water. For example, some highly concentrated sodium chloride aqueous solutions have a critical temperature above 700° C. The same type of increase in critical temperature is contemplated to be observed with catalysts of the present invention.

Overall, the present invention provides significantly lower cost processes for acceptable waste disposal to the environment.

Significant differences over the conventional art processes are as follows:

a. The rates of hydrolysis of nitrate esters, e.g., nitroglycerin, pentaerythritol tetranitrate) or nitramines (e.g., RDX, HMX, CL-20) in neutral water were very high. The rates of hydrolysis were much higher than oxidation at similar conditions to produce moieties degraded to levels beyond those of simple hydrolysis.

b. Nitroarenes (e.g., TNT, DNT) which have no obvious hydrolytic degradation route were unexpectedly unstable in neutral water at hydrothermal conditions reflecting the potential broad applicability of this innovation.

c. The addition of simple water soluble nonpolluting salts at the parts per million (ppm) level provided substantial hydrothermal catalysis for nitrate esters, nitramines, nitroarenes and other materials.

d. More specifically, with the use of the present process, nitric acid esters, nitramides, nitroarenes and a wide range of other materials dissolved in water are decomposed quantitatively into many organic fragments (e.g., oxidation products of the alcohol derived from the ester, including $CO_2$) which are not generally toxic and which can be degraded in a conventional manner, e.g., a biological sewage treatment facility.

The practical benefits of this catalysis are demonstrated in FIGS. 1A and 4. These figures present Arrhenius plots for the decomposition of TNT in neutral water over the range 200°–260° C. With a goal of disposal system with characteristic times in seconds or less, it appears that temperatures above 350° C. would be necessary. However, if the catalytic effectiveness of tetraborate is reasonably constant at temperatures above 200° C., then it is seen that the use of a 1.0 mM solution of the salt lowers the temperature necessary for single-digit half lives to about 300° C. This action in turn lowers the accompanying pressures from greater than about 200 atm to about 80–85 atm, and clearly larger quantities of added salt reduce the effective reaction conditions even more.

The saturated vapor pressure of water is the autogenous vapor pressure at a particular temperature. Table A below is taken from page D-149 of *The CRC Handbook of Chemistry and Physics*, 52nd ed., published in 1971 by the Chemical Rubber Company of Cleveland, Ohio 44128. This means, for example, that at a temperature of 350° C., the autogenous pressure is 2397.799 psi=218 atm. Of course, the actual reaction pressure at any temperature can be higher at any temperature using external pressure equipment of the art. The hydrothermal decomposition of the present invention occurs at each of the temperatures up to 373° C. as listed in Table A, preferably above 200° C., more preferably above 250° C., especially preferred is above 300° C.

It is well established that the critical temperature of water is 374° C. at a pressure of 217.7 atmospheres. The conversion ratios for various conventions for pressure are 1 atmosphere (atm)=14,695 pounds per square inch (psi)=1.013 bar=1.013×$10^5$ pascal (Pa)=760 torr.

TABLE A

| | SATURATED VAPOR PRESSURE OF WATER | |
|---|---|---|
| | Pressure | |
| Temp. °C. | mm | Pounds per sq. in. |
| 170 | 5940.92 | 114.879 |
| 171 | 6085.32 | 117.671 |
| 172 | 6233.52 | 120.537 |
| 173 | 6383.24 | 123.432 |
| 174 | 6538.28 | 126.430 |
| 175 | 6694.08 | 129.442 |
| 176 | 6852.92 | 132.514 |
| 177 | 7015.56 | 135.659 |
| 178 | 7180.48 | 138.848 |
| 179 | 7349.20 | 142.110 |
| 180 | 7520.20 | 145.417 |
| 181 | 7694.24 | 148.782 |
| 182 | 7872.08 | 152.221 |
| 183 | 8052.96 | 155.719 |
| 184 | 8236.88 | 159.275 |
| 185 | 8423.84 | 162.890 |
| 186 | 8616.12 | 166.609 |
| 187 | 8809.92 | 170.356 |
| 188 | 9007.32 | 174.177 |
| 189 | 9208.16 | 178.057 |
| 190 | 9413.36 | 182.025 |
| 191 | 9620.08 | 186.022 |
| 192 | 9831.36 | 190.107 |
| 193 | 10047.20 | 194.281 |
| 194 | 10265.32 | 198.499 |

TABLE A-continued

SATURATED VAPOR PRESSURE OF WATER

| Temp. °C. | Pressure mm | Pressure Pounds per sq. in. |
|---|---|---|
| 195 | 10488.76 | 202.819 |
| 196 | 10715.24 | 207.199 |
| 197 | 10944.76 | 211.637 |
| 198 | 11179.60 | 216.178 |
| 199 | 11417.48 | 220.778 |
| 200 | 11659.16 | 225.451 |
| 201 | 11905.40 | 230.213 |
| 202 | 12155.44 | 235.048 |
| 203 | 12408.52 | 239.942 |
| 204 | 12666.16 | 244.924 |
| 205 | 12929.12 | 250.008 |
| 206 | 13197.40 | 255.196 |
| 207 | 13467.96 | 260.428 |
| 208 | 13742.32 | 265.733 |
| 209 | 14022.76 | 271.156 |
| 210 | 14305.48 | 276.623 |
| 211 | 14595.04 | 282.222 |
| 212 | 14888.40 | 287.895 |
| 213 | 15184.80 | 293.626 |
| 214 | 15488.04 | 299.490 |
| 215 | 15792.80 | 305.383 |
| 216 | 16104.40 | 311.408 |
| 217 | 16420.56 | 317.522 |
| 218 | 16742.04 | 323.738 |
| 219 | 17067.32 | 330.028 |
| 220 | 17395.64 | 336.377 |
| 221 | 17731.56 | 342.872 |
| 222 | 18072.80 | 349.471 |
| 223 | 18417.84 | 356.143 |
| 224 | 18766.68 | 362.888 |
| 225 | 19123.12 | 369.781 |
| 226 | 19482.60 | 376.732 |
| 227 | 19848.92 | 383.815 |
| 228 | 20219.80 | 390.987 |
| 229 | 20596.76 | 398.276 |
| 230 | 20978.28 | 405.654 |
| 231 | 21365.12 | 413.134 |
| 232 | 21757.28 | 420.717 |
| 233 | 22154.00 | 428.388 |
| 234 | 22558.32 | 436.207 |
| 235 | 22967.96 | 444.128 |
| 236 | 23382.92 | 452.152 |
| 237 | 23802.44 | 460.264 |
| 238 | 24229.56 | 468.523 |
| 239 | 24661.24 | 476.871 |
| 240 | 25100.52 | 485.365 |
| 241 | 25543.60 | 493.933 |
| 242 | 25994.28 | 502.647 |
| 243 | 26449.52 | 511.450 |
| 244 | 26912.36 | 520.400 |
| 245 | 27381.28 | 529.467 |
| 246 | 27855.52 | 538.638 |
| 247 | 28335.84 | 547.926 |
| 248 | 28823.76 | 557.360 |
| 249 | 29317.00 | 566.898 |
| 250 | 29817.84 | 576.583 |
| 251 | 30324.00 | 586.370 |
| 252 | 30837.76 | 596.305 |
| 253 | 31356.84 | 606.342 |
| 254 | 31885.04 | 616.558 |
| 255 | 32417.80 | 626.858 |
| 256 | 32957.40 | 637.292 |
| 257 | 33505.36 | 647.888 |
| 258 | 34059.40 | 658.601 |
| 259 | 34618.76 | 669.417 |
| 260 | 35188.00 | 680.425 |
| 261 | 35761.80 | 691.520 |
| 262 | 36343.20 | 702.763 |
| 263 | 36932.20 | 714.152 |
| 264 | 37529.56 | 725.703 |
| 265 | 38133.00 | 737.372 |
| 266 | 38742.52 | 749.158 |
| 267 | 39361.92 | 761.135 |
| 268 | 39986.64 | 773.215 |
| 269 | 40619.72 | 785.457 |
| 270 | 41261.16 | 797.861 |
| 271 | 41910.20 | 810.411 |
| 272 | 42566.08 | 823.094 |
| 273 | 43229.56 | 835.923 |
| 274 | 43902.16 | 848.929 |
| 275 | 44580.84 | 862.053 |
| 276 | 45269.40 | 875.367 |
| 277 | 45964.04 | 888.799 |
| 278 | 46669.32 | 902.437 |
| 279 | 47382.20 | 916.222 |
| 280 | 48104.20 | 930.183 |
| 281 | 48833.80 | 944.291 |
| 282 | 49570.24 | 958.532 |
| 283 | 50316.56 | 972.963 |
| 284 | 51072.76 | 987.586 |
| 285 | 51838.08 | 1002.385 |
| 286 | 52611.76 | 1017.345 |
| 287 | 53395.32 | 1032.497 |
| 288 | 54187.24 | 1047.810 |
| 289 | 54989.04 | 1063.314 |
| 290 | 55799.20 | 1078.980 |
| 291 | 56612.40 | 1094.705 |
| 292 | 57448.40 | 1110.871 |
| 293 | 58284.40 | 1127.036 |
| 294 | 59135.60 | 1143.496 |
| 295 | 59994.40 | 1160.102 |
| 296 | 60860.80 | 1176.836 |
| 297 | 61742.40 | 1193.903 |
| 298 | 62624.00 | 1210.950 |
| 299 | 63528.40 | 1228.439 |
| 300 | 64432.80 | 1245.927 |
| 301 | 65352.40 | 1263.709 |
| 302 | 66279.60 | 1281.638 |
| 303 | 67214.40 | 1299.714 |
| 304 | 68156.80 | 1317.937 |
| 305 | 69114.40 | 1336.454 |
| 306 | 70072.00 | 1354.971 |
| 307 | 71052.40 | 1373.929 |
| 308 | 72048.00 | 1393.181 |
| 309 | 73028.40 | 1412.139 |
| 310 | 74024.00 | 1431.390 |
| 311 | 75042.40 | 1451.083 |
| 312 | 76076.00 | 1471.070 |
| 313 | 77117.20 | 1491.203 |
| 314 | 78166.00 | 1511.484 |
| 315 | 79230.00 | 1532.058 |
| 316 | 80294.00 | 1552.632 |
| 317 | 81373.20 | 1573.501 |
| 318 | 82467.60 | 1594.663 |
| 319 | 83569.60 | 1615.972 |
| 320 | 84686.80 | 1637.575 |
| 321 | 85819.20 | 1659.472 |
| 322 | 86959.20 | 1681.316 |
| 323 | 88114.40 | 1703.854 |
| 324 | 89277.20 | 1726.339 |
| 325 | 90447.60 | 1748.971 |
| 326 | 91633.20 | 1771.897 |
| 327 | 92826.40 | 1794.969 |
| 328 | 94042.40 | 1818.483 |
| 329 | 95273.60 | 1842.291 |
| 330 | 96512.40 | 1866.245 |
| 331 | 97758.80 | 1890.346 |
| 332 | 90020.40 | 1914.742 |
| 333 | 100297.20 | 1939.431 |
| 334 | 101581.60 | 1964.267 |
| 335 | 102881.20 | 1989.398 |
| 336 | 104196.00 | 2014.822 |
| 337 | 105526.00 | 2040.540 |
| 338 | 106871.20 | 2066.552 |
| 339 | 108224.00 | 2092.710 |
| 340 | 109592.00 | 2119.163 |
| 341 | 110967.60 | 2145.763 |
| 342 | 112358.40 | 2172.657 |
| 343 | 113749.20 | 2199.550 |
| 344 | 115178.00 | 2227.179 |
| 345 | 116614.40 | 2254.954 |
| 346 | 118073.60 | 2283.171 |

TABLE A-continued
SATURATED VAPOR PRESSURE OF WATER

| Temp. °C. | Pressure mm | Pounds per sq. in. |
|---|---|---|
| 347 | 119532.80 | 2311.387 |
| 348 | 121014.80 | 2340.044 |
| 349 | 122504.40 | 2368.848 |
| 350 | 124001.60 | 2397.799 |
| 351 | 125521.60 | 2427.191 |
| 352 | 127049.20 | 2456.730 |
| 353 | 128599.60 | 2486.710 |
| 354 | 130157.60 | 2516.837 |
| 355 | 131730.80 | 2547.258 |
| 356 | 133326.80 | 2578.119 |
| 357 | 134945.60 | 2609.422 |
| 358 | 136579.60 | 2641.018 |
| 359 | 138228.80 | 2672.908 |
| 360 | 139893.20 | 2705.093 |
| 361 | 141572.80 | 2737.571 |
| 362 | 143275.20 | 2770.490 |
| 363 | 144992.80 | 2803.703 |
| 364 | 146733.20 | 2837.337 |
| 365 | 148519.20 | 2871.892 |
| 366 | 150320.40 | 2906.722 |
| 367 | 152129.20 | 2941.698 |
| 368 | 153960.80 | 2977.116 |
| 369 | 155815.20 | 3012.974 |
| 370 | 157692.40 | 3049.273 |
| 371 | 159584.80 | 3085.866 |
| 372 | 161507.60 | 3123.047 |
| 373 | 163468.40 | 3160.963 |
| 374 | 165467.20 | 3199.613 |

General Safety—In any waste disposal system, safety is always important. With energetic materials (e.g., ordnance) thermal, sensitivity must be accounted for because of the danger of deflagration to detonation. Comparative data are shown in FIG. 5 for TNT and include the time to explosion for confined, heated samples. The time to explosion data define a region of energetic reaction of about 200° C. and tens of hours, extending to temperatures above 400° C. and times of a few seconds. The data line 41 for hydrothermal decomposition appears to be tangential to the autoignition region 42 and meets the boundary between about 250° and 300° C.

The important practical aspects are therefore apparent. When involved with bulk energetic materials (e.g., ordnance) in a hot reactor, there are time and temperature conditions to be avoided.

The experiments are conducted with quantities of TNT well above the ambient temperature solubility limits in water, i.e., the experiments start with solid bulk TNT in the reactor. The TNT decomposes safely and smoothly following first order reaction kinetics. In contrast, it is apparent from FIG. 5 that wet air oxidation and supercritical water oxidation processes are performed well within the TNT autoignition region and are therefore subject to possible unpredictable energetic events.

The following Examples are provided to explain and the describe the invention. They are not to be construed to be limiting in any way.

General—The materials described herein are available from a number of commercial industrial sources, e.g., Dow Chemical, DuPont, Aldrich Chemical, etc. Specific purities and compositions can be found in *Chemical Sources U.S.A.* published annually by Directories Publications, Inc. of Boca Ratan, Fla.
Specific Materials AP—Solutions of about 2 mM ammonium perchlorate were prepared with unbuffered Milli-Q water.

RDX—A 90–103 $\mu$M (20–23 ppm) solution of RDX was prepared by stirring 5–5.7 mg of solid RDX in 250 mL of Milli-Q water overnight. A 5 $\mu$M (1.5 ppm) solution of HMX was prepared by stirring 1.5 mg of solid HMX in 1 L of Milli-Q water for three days. These concentrations are half the solubility limits of about 44 ppm and 2.6 ppm, respectively, reported by Spanggord et al. (1980, 1982).

NG—Nitroglycerin was purified by extracting 1.0 g of solid 9:1 lactose:NG with 4 mL of ethyl ether, filtering, and evaporating the ether solution under a stream of air. The residual NG was dissolved in 50 mL of water to prepare a 3.8 mM stock solution and stored at room temperature.

ADN—A 7 mM of solution of ADN was prepared by stirring 86.8 mg of solid ADN in 100 mL of water for a few minutes until all dissolved.

CL-20—Homogeneous solutions of CL-20 in water were prepared by stirring 39.1 mg of solid CL-20 in 100 mL of Milli-Q water in a volumetric flask overnight (15 hr). The mixture was then filtered, and the mass of the dried, recovered material (31.3 mg) showed that only about 20% of the CL-20 had gone into solution. The resulting saturated solution was diluted to about 100 $\mu$M and stored at room temperature.

TNT-Reagent grade TNT was used with no further purification. TNT is highly photosensitive, and accordingly all manipulations were done in dim, indirect lighting or in the dark. A stock solution of TNT was prepared by stirring 22.7 mg of solid TNT in 100 mL of Milli-Q water overnight in a stoppered Erlenmeyer flask, wrapped in aluminum foil. This concentration is about half the solubility limit of about 1.0 mM. The solution was filtered and stored in the dark at room temperature.

For the purposes of the present invention the concentration in molarity (or % by weight) for each salt is expressed for the pure salt disregarding any waters of hydration present.

Example 1

General Experimental Procedure

A 5 to 100 $\mu$M solution of the waste material nitro compound (e.g. such as TNT) is prepared by stirring the weighed compound in 250 mL of Milli-Q water. The desired amounts of added salts are also weighed and added to the solution, or added directly into the reactor. The solution is then weighed into a glass reactor and the reactor is sealed with a torch. A stainless steel reactor is used when the reaction is performed under pressure. The reactor is heated in a bath at the desired temperature for a specified amount of time. The reaction was quenched by rapid cooling to ambient temperature.

The gaseous products are removed using standard conventional vacuum trap techniques. Analyses are performed on a Hewlett Packard 5711 gas chromatograph with a thermal conductivity detector. The organic products are analyzed with a Hewlett Packard 1090 high pressure liquid chromatograph (HPLC). A diode array detector is used to monitor the compounds at 200 nanometers (nm). Ionic products are analyzed by ion chromatography using a DIONEX 2000i chromatograph having a conductivity detector. All chromatography methods use either a Hewlett Packard 3390 integrator or a DIONEX 4270 integrator. External standards are used to identify and quantitate the reaction products.

Example 2

Hydrothermolysis of RDX, NG and TNT

Experiments used to obtain the data points for FIGS. 2 and 3 were standard kinetic experiments is described by S. L. Friess and A. Weissberger, *Rates and Mechanisms of Reactions*, Vol. VIII, published in 1953 by Interscience, Inc. of New York, N.Y.

Example 3

Experiments used to obtain the Arrhenius data points for FIGS. 1A, 1B and 4 were standard kinetic experiments are described by S. L. Friess and A. Weissberger, *Rates and Mechanisms of Reactions*, Vol. VIII, published in 1953 by Interscience, Inc. of New York, N.Y.

Example 4

RDX—Kinetics

Table 1 shows the results of destruction of RDX at 150° C.

TABLE 1

Hydrothermolytic Destruction of RDX at 150° C. in Liquid, Neutral Water — Effects of Container Walls

| time/min | % Remaining, Quartz | % Remaining, PYREX ® |
|---|---|---|
| 30 | 64 | 9 |
| 69 | 58 | 0 |
| 120 | 39 | 0 |
| 240 | 18 | 0 |
| 390 | 9 | 0 |

Quartz is essentially 100% silicate. PYREX ® (trademark of the Corning Glass Company, Inc., Corning, N.Y.) is silica glass having borate as a component.

From this result it appears that either silicate and/or borate leached into the water during the run and accelerated the hydrothermal decomposition.

Example 5

Nitroglycerin—Kinetics

Table 2 shows the rate constants for the hydrothermolysis of NG at 150° C.

TABLE 2

Rate Constants for the Hydrothermolysis of NG at 150° C. in Neutral Water

| Conditions | $k_n \times 10^4$ (s$^{-1}$) |
|---|---|
| Quartz | 2.67 |
| Quartz with 100 μM $Na_2B_4O_7$ | 4.80 |
| PYREX ® | 5.93 |
| Quartz with crushed Pyrex | 7.45 |
| Quartz with 100 μM $Na_2SiO_3$ | 18.20 |

This result shows that at least for NG, added silicate was highly effective, but that added catalytic amounts of borate were considerably less effective.

Example 6

Products of Reaction—Nitroglycerin (NG)

Table 3 is a summary of the neutral hydrolysis products of nitroglycerin.

TABLE 3

Summary of Hydrolysis Products of NG Yields at 150° C.[a]

| Conditions | $C_2O_4=$ | $HOCH_2CO_2-$ | $HCO_2-$ | $HCOCO_2-$ | $NO_2-$ | $NO_3-$ |
|---|---|---|---|---|---|---|
| Quartz Reactor | — | 45.8 | 14.2 | — | — | 94.5 |
| PYREX ® Reactor | — | 29.5 | 19.8 | 2.8 | 10.7 | 69.6 |
| Quartz with crushed PYREX ® | — | — | 97.9 | — | 6.6 | 86.3 |
| Quartz with $Na_2B_4O_7$ | — | 24.1 | 17.8 | 9.1 | 14.7 | 65.7 |
| Quartz with $Na_2SiO_3$ | 12.7 | — | 81.4 | — | 45.8 | 52.9 |

[a]Reported as final yields in percent of initial NG-nitrogen and NG-carbon, respectively.

This result shows that crushed PYREX ® and added silicate shifted the product balance, such that most of the starting carbon ended up simply as formate.

Example 7

TNT—Kinetics

Table 4 shows the kinetic effects of added borate and silicate in the destruction of TNT.

TABLE 4

Kinetic Effects of Added Borate and Silicate at 200° C.

| ($Na_2B_4O_7$) (M) | $k_{salt} \times 10^4$ (s$^{-1}$) | ($Na_2SiO_3$) (M) | $k_{salt} \times 10^4$ (s$^{-1}$) |
|---|---|---|---|
| $1.0 \times 10^{-6}$ | 2.84 | $1.0 \times 10^{-5}$ | 3.46 |
| $1.0 \times 10^{-4}$ | 5.25 | $1.0 \times 10^{-4}$ | 9.12 |
| $5.0 \times 10^{-4}$ | 13.80 | $3.0 \times 10^{-4}$ | 19.05 |
| $1.0 \times 10^{-3}$ | 77.62 | $1.0 \times 10^{-3}$ | 74.13 |

FIG. 2, shows the kinetic salt effects on the hydrothermolysis of TNT in water at 200° C. The line 21 on the right in the salt-active region is sketched in at unit slope and graphically. FIG. 2 graphically shows the effects of increasing salt, this time including phosphate.

FIG. 3 is a graph of the effects of pH on the hydrothermolysis on TNT. The pH values are for the starting solutions at room temperature. FIG. 3 shows the separation of the effects of the basicity of salt solutions. It demonstrates that while there is a small effect of added base, the bulk of the effects for borate and silicates are due to some type of salt effect.

Example 8

Hydrothermal Decompositions of TNT Crushed Quartz/Aqueous Solution

Crushed quartz (silica, $SiO_2$) in suspension was found to increase the rate of hydrothermal decomposition substantially, presumably due to the introduction of silicate into the aqueous phase.

Experiments were performed on TNT at 180° C. (This temperature was selected as a safety measure). Five to 10 mg of powdered quartz were added to each 10 ml size quartz vial which was then filled with 8 ml of 17.6 ppm TNT as an aqueous solution. A control experiment was performed using same size quartz vials without adding powdered quartz to the solution.

Heating and analysis were performed. Observed results are given in the following Table 5.

TABLE 5

HYDROTHERMAL DECOMPOSITION OF TNT
(Using powdered quartz)

| Time (sec) | TNT (ppm) | TNT + Quartz (ppm) |
|---|---|---|
| 0 | 17.6 | 17.6 |
| 10800 | 15.8 | 2.5 |
| 18000 | 13.6 | 0.4 |

These results clearly show that the addition of insoluble quartz powder has increased the rate of decay at least by an order of magnitude. A decrease in first order decay rate was also observed by changing vial size from 3 to 10 ml at 220° C. All this information is consistent with heterogeneous surface reactions on powdered quartz (silica) during hydrothermal decomposition.

Example 9

TNT Hydrothermal Decomposition a. The hydrothermal decomposition of TNT occurs at a number of pressures temperatures and times using sodium tetraborate as a catalyst. See Table 6 below. Under these conditions and the intermediate conditions, 99.9% or greater of the TNT is safely decomposed.

Note: For sodium tetraborate, $Na_2B_4O_7$, the molecular weight is 201.19.

Thus, in Table 6 below having a salt concentration of $5 \times 10^{-3}$, is about 1 gram of salt in 1000 ml (1000 g) water. This corresponds to about 0.1 percent by weight of salt in the water-catalyst present.

The concentration (in % by weight) of salts described in Examples 9, 10 and 11 is easily calculated.

TABLE 6

HYDROTHERMAL DECOMPOSITION OF 2,4,6-TRINITROTOLUENE (TNT)
(Using sodium tetraborate as the salt catalyst)

| No. | Temperature (°C.) | Pressure (psi) | Salt (M) | Time for 99.9% destruction (sec) |
|---|---|---|---|---|
| 1 | 200 | 240 | $1 \times 10^{-3}$ | 2000 |
| 2 | 200 | 240 | $5 \times 10^{-3}$ | 600 |
| 3 | 200 | 240 | $1 \times 10^{-2}$ | 100 |
| 4 | 200 | 240 | $1 \times 10^{-1}$ | 6 |
| 5 | 250 | 585 | $1 \times 10^{-3}$ | 150 |
| 6 | 250 | 585 | $4 \times 10^{-3}$ | 600 |
| 7 | 250 | 585 | $1 \times 10^{-2}$ | 10 |
| 8 | 250 | 585 | $1 \times 10^{-1}$ | .6 |
| 9 | 250 | 585 | 1 | .06 |
| 10 | 300 | 1290 | $1 \times 10^{-3}$ | 40 |
| 11 | 300 | 1290 | $1 \times 10^{-2}$ | 2 |
| 12 | 300 | 1290 | $1 \times 10^{-1}$ | .1 |
| 13 | 300 | 1290 | 1 | .01 |
| 14 | 350 | 2490 | $1 \times 10^{-4}$ | 100 |
| 15 | 350 | 2490 | $1 \times 10^{-3}$ | 10 |
| 16 | 350 | 2490 | $1 \times 10^{-2}$ | .8 |
| 17 | 350 | 2490 | $1 \times 10^{-1}$ | .03 | b. Similarly, when the experiments of Table 6 are performed replacing sodium tetraborate with a stoichiometrically equivalent amount of sodium silicate, 99.9% or greater of the TNT is safely decomposed.

c. Similarly, when the experiments of Table 6 are performed replacing sodium tetraborate with a stoichiometrically equivalent amount of trisodium phosphate, 99.9% or greater of the TNT is safely composed.

d. Similarly, when the experiments of Table 6 of Example 9a are performed replacing the TNT with a stoichiometrically equivalent amount of 2,4- or 2,6-dinitrotoluene (DNT) or combinations thereof, 99.9% or greater of the DNT is safely decomposed.

e. Similarly, when the experimental conditions of Table 6 of Example 9b are performed replacing the TNT with a stoichiometrically equivalent amount of 2,4- or 2,6-dinitrotoluene (DNT) or combinations thereof, 99.9% or greater of the DNT is safely decomposed.

f. Similarly, when the experimental conditions of Table 6 of Example 9c are performed replacing the TNT with a stoichiometrically equivalent amount of 2,4- or 2,6-dinitrotoluene (DNT) or combinations thereof, 99.9% or greater of the DNT is safely decomposed.

g. Similarly, when the experiments of Table 6 of Example 9a are performed replacing the TNT with a stoichiometrically equivalent amount of picric acid, 99.9% or greater of the picric acid is safely decomposed.

h. Similarly, when the experimental conditions of Table 6 of Example 9b are performed replacing the TNT with a stoichiometrically equivalent amount of picric acid, 99.9% or greater of the picric acid is safely decomposed.

i. Similarly, when the experimental conditions of Table 6 of Example 9c are performed replacing the TNT with a stoichiometrically equivalent amount of picric acid, 99.9% or greater of the picric acid is safely decomposed.

j. The hydrothermal decomposition of TNT, DNT or picric acid occurs at a number of pressures, temperatures and times independently replacing sodium tetraborate of Example 9a, sodium silicate of Example 9b, or trisodium phosphate or Example 9c with a stoichiometrically equivalent amount of calcium borate, calcium silicate or calcium phosphate, respectively as a catalyst. See Table 6 above. Under these conditions and the intermediate conditions, 99.9% or greater of the TNT, DNT or picric acid is safely decomposed.

k. Similarly, when the experimental conditions of Examples 9a to Example 9i above produce a hydrothermal decomposition of TNT, DNT or picric acid of 99.9% or greater, in some experiments the hydrothermal decomposition of TNT, DNT or picric acid is 99.99% or greater.
l. Similarly, when the experimental conditions of Examples 9a to Example 9i above produce a hydrothermal decomposition of TNT, DNT or picric acid of 99.9% or greater, in some experiments the hydrothermal decomposition of TNT, DNT or picric acid is 99.999% or greater.

Example 10

RDX Hydrothermal Decomposition a. The hydrothermal decomposition of RDX occurs at a number of pressures temperatures and times using sodium tetraborate as a catalyst. See Table 7 below. Under these conditions and the intermediate conditions, 99.9% or greater of the RDX is safely decomposed.

TABLE 7

HYDROTHERMAL DECOMPOSITION OF RDX
(Using sodium tetraborate as the salt catalyst)

| No. | Temperature (°C.) | Pressure (psi) | Salt (M) | Time for 99.9% destruction (sec) |
|---|---|---|---|---|
| 1  | 150 | 69  | $1 \times 10^{-3}$  | 1200 |
| 2  | 150 | 69  | $1 \times 10^{-2}$  | 120 |
| 3  | 150 | 69  | $1 \times 10^{-1}$  | 12 |
| 4  | 150 | 69  | 1                    | 1.2 |
| 5  | 200 | 240 | $5 \times 10^{-4}$  | 600 |
| 6  | 200 | 240 | $1 \times 10^{-4}$  | 300 |
| 7  | 200 | 240 | $1 \times 10^{-3}$  | 30 |
| 8  | 200 | 240 | $1 \times 10^{-2}$  | 3 |
| 9  | 200 | 240 | $1 \times 10^{-1}$  | .3 |
| 10 | 200 | 240 | 1                    | .03 |
| 11 | 250 | 585 | $1 \times 10^{-5}$  | 200 |
| 12 | 250 | 585 | $1 \times 10^{-4}$  | 20 |
| 13 | 250 | 585 | $1 \times 10^{-3}$  | 2 |
| 14 | 250 | 585 | $10 \times 10^{-2}$ | .2 |
| 15 | 250 | 585 | $10 \times 10^{-1}$ | 0.02 | b. Similarly, when the experiments of Table 7 are performed replacing sodium tetraborate with a stoichiometrically equivalent amount of sodium silicate, 99.9% or greater of the RDX is safely decomposed.
c. Similarly, when the experiments of Table 7 are performed replacing sodium tetraborate with a stoichiometrically equivalent amount of trisodium phosphate, 99.9% or greater of the RDX is safely decomposed.
d. Similarly, when the experiments of Table 7 of Example 10a are performed replacing the RDX with a stoichiometrically equivalent amount of HMX, 99.9% or greater of the HMX is safely decomposed.
e. Similarly, when the experimental conditions of Table 7 of Example 10b are performed replacing the RDX with a stoichiometrically equivalent amount of HMX, 99.9% or greater of the HMX is safely decomposed.
f. Similarly, when the experimental conditions of Table 7 of Example 10c are performed replacing the RDX with a stoichiometrically equivalent amount of HMX, 99.9% or greater of the HMX is safely decomposed.
g. The hydrothermal decomposition of RDX or HMX occurs at a number of pressures temperatures and times independently replacing sodium tetraborate of Example 10a, sodium silicate of Example 10b, or trisodium phosphate of Example 10c with a stoichiometrically equivalent amount of calcium borate, calcium silicate or calcium phosphate respectively, as a catalyst. See Table 7 above. Under these conditions and the intermediate conditions, 99.9% or greater of the RDX or HMX is safely decomposed.
h. Similarly, when the experimental conditions of Example 10a to Example 10g above produce a hydrothermal decomposition of RDX or HMX of 99.9% or greater, in some experiments the hydrothermal decomposition of RDX or HMX is 99.99% or greater.
i. Similarly, when the experimental conditions of Examples 10a to Example 10g above produce a hydrothermal decomposition of RDX or HMX of 99.9% or greater, in some experiments the hydrothermal decomposition of RDX or HMX or is 99.999% or greater.

Example 11

Nitroglycerin (NG) Hydrothermal Decomposition a. The hydrothermal decomposition of NG occurs at a number of pressures temperatures and times using sodium tetraborate as a catalyst. See Table 8 below. Under these conditions and the intermediate conditions, 99.9% or greater of the NG is safely decomposed.

TABLE 8

HYDROTHERMAL DECOMPOSITION OF NITROGLYCERIN (NG)
(Using sodium tetraborate as the salt catalyst)

| No. | Temperature (°C.) | Pressure (psi) | Salt (M) | Time for 99.9% destruction (sec) |
|---|---|---|---|---|
| 1  | 150 | 69  | $1 \times 10^{-4}$ | 5000 |
| 2  | 150 | 69  | $1 \times 10^{-3}$ | 505 |
| 3  | 150 | 69  | $1 \times 10^{-2}$ | 55 |
| 4  | 150 | 69  | $1 \times 10^{-1}$ | 5 |
| 5  | 200 | 240 | $1 \times 10^{-5}$ | 600 |
| 6  | 200 | 240 | $1 \times 10^{-4}$ | 60 |
| 7  | 200 | 240 | $1 \times 10^{-3}$ | 6 |
| 8  | 200 | 240 | $1 \times 10^{-2}$ | .6 |
| 9  | 250 | 585 | $1 \times 10^{-4}$ | .9 |
| 10 | 250 | 585 | $1 \times 10^{-3}$ | 9 | b. Similarly, when the experiments of Table 8 are performed replacing sodium tetraborate with a stoichiometrically equivalent amount of sodium silicate, 99.9% or greater of the NG is safely decomposed.
c. Similarly, when the experiments of Table 8 are performed replacing sodium tetraborate with a stoichiometrically equivalent amount of trisodium phosphate, 99.9% or greater of the NG is safely decomposed.
d. Similarly, when the experiments of Table 8 of Example 11a are performed replacing the NG with a stoichiometrically equivalent amount of pentaerythritoltetranitrate, 99.9% or greater of the pentaerythritoltetranitrate is safely decomposed.
e. Similarly, when the experimental conditions of Table 8 of Example 11b are performed replacing the NG with a stoichiometrically equivalent amount of pentaerythritoltetranitrate, 99.9% or greater of the pentaerythritoltetranitrate is safely decomposed.

f. Similarly, when the experimental conditions of Table 8 of Example 11c are performed replacing the NG with a stoichiometrically equivalent amount of pentaerythritoltetranitrate, 99.9% or greater of the pentaerythritoltetranitrate is safely decomposed.

g. The hydrothermal decomposition of NG occurs at a number of pressures temperatures and times independently replacing sodium tetraborate of Example 11a, sodium silicate of Example 11b, or trisodium phosphate of Example 11c with a stoichiometrically equivalent amount of calcium borate, calcium silicate or calcium phosphate, respectively as a catalyst. See Table 8 above. Under these conditions and the intermediate conditions, 99.9% or greater of the NG is safely decomposed.

h. Similarly, when the experimental conditions of Example 11a to Example 11g above produce a hydrothermal decomposition of NG or pentaerythritoltetranitrate is 99.9% or greater, in some experiments the hydrothermal decomposition of NG or pentaerythritoltetranitrate is 99.99% or greater.

i. Similarly, when the experimental conditions of Examples 11a to Example 11g above produce a hydrothermal decomposition of NG or pentaerythritoltetranitrate of 99.9% or greater, in some experiments the hydrothermal decomposition of NG or pentaerythritoltetranitrate is 99.999% or greater.

While only a few embodiments of the invention have been shown and described herein, it will become apparent to those skilled in the art that various modifications and changes can be made in the catalytic conversion of hydrothermally labile chemical groups and compounds to species which are environmentally acceptable, or are amendable to further degradation without departing from the spirit and scope of the present invention. All such modifications and changes coming within the scope of the appended claims are intended to be carried out thereby.

We claim:

1. A process for the disposal of waste or the conversion of hydrothermally labile chemical groups and compounds by hydrothermal decomposition to compounds which are environmentally acceptable, or hydrothermal conversion to compounds which are then amenable to further degradation by conventional disposal systems to produce environmentally acceptable products, which process comprises:

(a) conveying an aqueous solution or aqueous slurry of ordnance waste into a reaction zone capable of withstanding the temperatures and pressures of hydrothermal decomposition of the hydrothermally labile chemical groups or compounds;

(b) reacting the waste in the reaction zone with an aqueous composition comprising a salt selected from the group consisting of silica, lithium silicate, sodium silicate, potassium silicate, rubidium silicate, cesium silicate, lithium borate, sodium borate, potassium borate, rubidium borate, cesium borate, lithium phosphate, sodium phosphate, potassium phosphate, rubidium phosphate, cesium phosphate, lithium biphosphate, potassium biphosphate, rubidium biphosphate, cesium biphosphate, trilithium phosphate, trisodium phosphate, tripotassium phosphate, trirubidium triphosphate, tricesium phosphate, and combinations thereof said salt in an amount effective to hydrothermally decompose said ordnance waste with the proviso that no oxidant or transition metal catalyst is added to the reaction mixture at between 200° C. and 500° C. and at a pressure between 20 and 400 atmospheres for between about 0.01 and 10 minutes wherein water as a liquid is always present;

(c) producing about 99.9% or greater hydrothermal decomposition of the ordnance waste or 99.9% or greater conversion of the waste to compounds which are environmentally acceptable or are amenable to further degradation; and (d) optionally degrading further the compounds of step (c) by reaction to environmentally acceptable products.

2. The process of claim 1 wherein the temperature in step (b) is between about 200° and 373° C.

3. The process of claim 2 wherein the concentration of salt in the reaction mixture is between about 0.01 and 1.5 percent by weight of the salt-water mixture.

4. The process of claim 3 wherein the concentration of waste present is between about 0.01 and 20 percent by weight of the waste-water-salt present.

5. The process of claim 1 wherein the concentration of waste present is between 0.01 and 20 percent by weight of the waste-water-salt present.

6. The process of claim 1 wherein the salt concentration of the aqueous composition is between about 1.51 and 9.99 percent by weight of the salt-water present.

7. The process of claim 1 wherein the salt concentration of the salt composition is between about 10 and 40 percent by weight of the salt-water present.

8. The process of claim 6 wherein the concentration of waste present is between 0.01 and 20 percent by weight of the waste-water-salt present.

9. The process of claim 1 wherein the waste is ordnance waste selected from the group consisting of nitrate esters, nitramines and nitroarenes.

10. The process of claim 9 wherein the nitrate esters are independently selected from the group consisting of nitroglycerin and pentaerythritoltetranitrate, the nitramines are selected from the group consisting of cyclotrimethylenetrinitramine (RDX) and cyclotetramethylenetetranitramine (HMX) and the nitroarenes are selected from the group consisting of 2,4,6-trinitrotoluene (TNT), 2,4,6-trinitropicramine, N-nitroamines and picric acid.

11. The process of claim 1 wherein the salt is independently selected from the group consisting of silica, sodium borate, potassium borate, sodium silicate, potassium silicate, sodium phosphate, potassium phosphate and combinations thereof.

12. The process of claim 6 wherein the salt is independently selected from the group consisting of silica, lithium silicate, sodium silicate, potassium silicate, rubidium silicate, cesium silicate, lithium borate, sodium borate, potassium borate, rubidium borate, cesium borate, lithium phosphate, sodium phosphate, potassium phosphate, rubidium phosphate, cesium phosphate, lithium biphosphate, potassium biphosphate, rubidium biphosphate, cesium biphosphate, trilithium phosphate, trisodium phosphate, tripotassium phosphate, trirubidium triphosphate, tricesium phosphate, and combinations thereof; and the temperature in step (b) is between about 200° and 373° C.

13. The process of claim 12 wherein:
in step (b) the temperature is between about 200° and 373° C., and the time is between about 0.01 and 5 min, and the salts are present in the aqueous composition in a concentration of between about 0.1 and 20 percent by weight of the catalyst-water present.

14. The process of claim 13 wherein the salts are independently selected from the group consisting of silica, sodium borate, potassium borate, sodium silicate, potassium silicate and combinations thereof.

15. The process of claim 1 wherein in step (b) the reaction temperature is between about 250° and 400° C., the pressure is between about 20 and 200 atmospheres and the contact time is between about 0.1 and 5 min.

16. The process of claim 1 wherein the salt is silica.

17. The process of claim 1 wherein:
in step (b) the salt is independently selected from the group consisting of sodium borate, potassium borate, sodium silicate, potassium silicate, trisodium phosphate, tripotassium phosphate and combinations thereof; and
the temperature of step (b) is between about 200° and 374° C. at the autogenic saturated vapor pressure of water.

18. The process of claim 17 wherein the reaction temperature in step (b) is between about 300° and 373° C.

19. The process of claim 1 wherein the hydrothermal decomposition or hydrothermal conversion of waste of step (b) and when coupled with step (c) is about 99.99% by weight or greater.

20. The process of claim 17 wherein the hydrothermal decomposition of step (b) or the hydrothermal conversion of step (b) coupled with the reaction of step (c) is about 99.99% or greater by weight of the starting waste.

21. The process of claim 20 wherein the temperature is between about 250° and 350° C.

22. The process of claim 20 wherein the temperature is between about 300° and 373° C.

23. The process of claim 1 wherein the hydrothermal decomposition or hydrothermal conversion of step (b) and optionally when coupled with step (c) is 99.999% by weight or greater.

24. The process of claim 19 wherein the hydrothermal decomposition of step (b) or the hydrothermal conversion of step (b) coupled with the reaction of step (c) is 99.999% or greater by weight of the starting waste material.

25. The process of claim 24 wherein the temperature is between about 250° and 350° C.

26. The process of claim 24 wherein the temperature is between about 300 and 373° C.

27. The process of claim 1 wherein the salt in the aqueous composition of step (b) is selected from the group consisting of silica, sodium borate, sodium silicate, magnesium borate, magnesium silicate, calcium borate, calcium silicate and combinations thereof.

28. The process of claim 27 wherein:
the temperature of step (b) is between about 200° and 373° C. at the autogenic saturated vapor pressure of water; and the waste is ordnance waste.

* * * * *